US011169666B1

(12) United States Patent
Sokolowski et al.

(10) Patent No.: US 11,169,666 B1
(45) Date of Patent: Nov. 9, 2021

(54) DISTRIBUTED CONTENT BROWSING SYSTEM USING TRANSFERRED HARDWARE-INDEPENDENT GRAPHICS COMMANDS

(71) Applicant: Amazon Technologies, Inc., Reno, NV (US)

(72) Inventors: Dmitry Sokolowski, Seattle, WA (US); Saral Jain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 928 days.

(21) Appl. No.: 14/285,477

(22) Filed: May 22, 2014

(51) Int. Cl.
*G06F 3/0484* (2013.01)
*G06F 40/14* (2020.01)

(52) U.S. Cl.
CPC ............ *G06F 3/0484* (2013.01); *G06F 40/14* (2020.01)

(58) Field of Classification Search
USPC ....................................................... 715/243
See application file for complete search history.

(56) References Cited

U.S. PATENT DOCUMENTS

| 5,500,933 | A | 3/1996 | Schnorf |
| 5,930,472 | A | 7/1999 | Smith |
| 5,978,842 | A | 11/1999 | Noble et al. |
| 5,982,392 | A | 11/1999 | Anfossi et al. |
| 6,061,715 | A | 5/2000 | Hawes |
| 6,230,168 | B1 | 5/2001 | Unger et al. |
| 6,271,840 | B1 | 8/2001 | Finseth et al. |

(Continued)

FOREIGN PATENT DOCUMENTS

| JP | 09-204347 | 8/1997 |
| JP | 2008-077353 | 4/2008 |

(Continued)

OTHER PUBLICATIONS

Merriam-Webster, Apr. 24, 2009, Merriam-Webster Online Dictionary, p. 1 (Year: 2009).*

(Continued)

*Primary Examiner* — Kavita Stanley
(74) *Attorney, Agent, or Firm* — Knobbe, Martens, Olson & Bear, LLP

(57) ABSTRACT

Server systems are provided that receive content request and respond with hardware-independent graphics commands instead of, or in addition to, unprocessed content items. Some server systems may act as intermediaries between user devices and content sources. The server systems can obtain content pages from content sources, process the content pages (e.g., using a headless browser), and provide hardware-independent graphics commands (e.g., vector graphics commands, that do not require specialized graphics hardware for execution) to user devices in response to requests for content. The hardware-independent graphics commands can be executed by client browsers to generate a representation of the content page that is the same or substantially the same as the representation that would have been generated by processing the content pages locally. A user device in receipt of such hardware-independent graphics commands can execute them without performing traditional content page processing, thereby improving user-perceived page load times.

25 Claims, 8 Drawing Sheets

(56) References Cited

U.S. PATENT DOCUMENTS

| | | |
|---|---|---|
| 6,356,908 B1 | 3/2002 | Brown et al. |
| 6,496,932 B1 | 12/2002 | Trieger |
| 6,657,647 B1 | 12/2003 | Bright |
| 7,051,084 B1 | 5/2006 | Hayton et al. |
| 7,191,211 B2 | 3/2007 | Tuli |
| 7,296,230 B2 | 11/2007 | Fukatsu et al. |
| 7,310,769 B1 | 12/2007 | Dash |
| 7,356,570 B1 | 4/2008 | Tuli |
| 7,499,051 B1 | 3/2009 | O'Donnell |
| 7,627,648 B1 | 12/2009 | Mehta et al. |
| 7,917,618 B1 | 3/2011 | Bettis et al. |
| 7,975,019 B1 | 7/2011 | Green et al. |
| 8,103,742 B1 | 1/2012 | Green |
| 8,200,896 B2 | 6/2012 | Schmieder et al. |
| 8,234,392 B2 | 7/2012 | Graffagnino et al. |
| 8,311,900 B1 | 11/2012 | Bates et al. |
| 8,314,809 B1 | 11/2012 | Grabowski et al. |
| 8,331,566 B1 | 12/2012 | Foote et al. |
| 8,365,144 B1 | 1/2013 | Webb |
| 8,539,338 B2 | 9/2013 | Zhu et al. |
| 8,610,725 B2 | 12/2013 | Sandmel et al. |
| 8,732,571 B2 | 5/2014 | Jain et al. |
| 8,754,827 B2 | 6/2014 | Braghis et al. |
| 8,766,986 B1 * | 7/2014 | Haase ................ G06F 8/38 345/473 |
| 8,769,052 B1 * | 7/2014 | Tidd ................ G06F 9/5044 345/419 |
| 8,913,067 B1 | 12/2014 | Kokkevis |
| 8,913,068 B1 | 12/2014 | Kokkevis |
| 8,943,197 B1 | 1/2015 | Taylor et al. |
| 8,990,674 B2 | 3/2015 | Shibukawa et al. |
| 9,075,893 B1 | 7/2015 | Jenkins |
| 9,454,515 B1 | 9/2016 | Jain |
| 9,563,928 B1 | 2/2017 | Sokolowski et al. |
| 9,563,929 B1 | 2/2017 | Sokolowski et al. |
| 9,720,888 B1 | 8/2017 | Jain et al. |
| 9,922,007 B1 | 3/2018 | Jain et al. |
| 10,031,891 B2 | 7/2018 | Kumar et al. |
| 10,042,521 B1 | 8/2018 | Joshi et al. |
| 10,095,663 B2 | 10/2018 | Kumar et al. |
| 2001/0038395 A1 | 8/2001 | Holtzblatt |
| 2001/0032238 A1 | 10/2001 | Cronin, III et al. |
| 2002/0015042 A1 | 2/2002 | Robotham |
| 2002/0078134 A1 | 6/2002 | Stone et al. |
| 2002/0091738 A1 | 7/2002 | Rohrabaugh |
| 2002/0170053 A1 | 11/2002 | Peterka et al. |
| 2003/0014478 A1 | 1/2003 | Noble |
| 2003/0025716 A1 | 2/2003 | Colavin |
| 2003/0046365 A1 | 3/2003 | Pfister et al. |
| 2003/0158916 A1 | 8/2003 | Cronin, III et al. |
| 2003/0200507 A1 | 10/2003 | Stern et al. |
| 2004/0095400 A1 | 5/2004 | Anderson et al. |
| 2004/0135784 A1 | 7/2004 | Cohen et al. |
| 2004/0186861 A1 | 9/2004 | Phatak |
| 2004/0239681 A1 | 12/2004 | Robotham et al. |
| 2005/0131887 A1 | 6/2005 | Rohrabaugh |
| 2005/0232227 A1 | 10/2005 | Jorgenson et al. |
| 2005/0243097 A1 | 11/2005 | Cohen et al. |
| 2005/0256836 A1 | 11/2005 | Awamoto et al. |
| 2006/0031774 A1 | 2/2006 | Gaudette |
| 2006/0064467 A1 | 3/2006 | Libby |
| 2006/0277478 A1 | 12/2006 | Seraji et al. |
| 2007/0150820 A1 | 6/2007 | Salvo |
| 2007/0156972 A1 | 7/2007 | Uehara |
| 2007/0192509 A1 | 8/2007 | Ohtsuka et al. |
| 2007/0234229 A1 | 10/2007 | Ohtsuka et al. |
| 2007/0263007 A1 | 11/2007 | Robotham et al. |
| 2007/0271288 A1 | 11/2007 | Martin et al. |
| 2007/0288841 A1 | 12/2007 | Rohrabaugh et al. |
| 2008/0018658 A1 | 1/2008 | Bruno et al. |
| 2008/0034292 A1 | 2/2008 | Brunner |
| 2008/0055623 A1 | 3/2008 | Piersol et al. |
| 2008/0077862 A1 | 3/2008 | Tolpin |
| 2008/0120393 A1 | 5/2008 | Chen et al. |
| 2008/0120626 A1 | 5/2008 | Graffagnino et al. |
| 2008/0133647 A1 | 6/2008 | Hamzeh |
| 2008/0181498 A1 | 7/2008 | Swenson et al. |
| 2008/0195692 A1 | 8/2008 | Hayosh et al. |
| 2008/0195698 A1 | 8/2008 | Stefanovic et al. |
| 2008/0222273 A1 | 9/2008 | Lakshmanan et al. |
| 2008/0229025 A1 | 9/2008 | Plamondon |
| 2008/0235594 A1 | 9/2008 | Bhumkar et al. |
| 2008/0295164 A1 * | 11/2008 | Steiner ................ H04L 63/10 726/14 |
| 2009/0002381 A1 * | 1/2009 | Harper ................ G06T 11/206 345/522 |
| 2009/0030976 A1 | 1/2009 | Shukla |
| 2009/0033986 A1 | 2/2009 | Himpe |
| 2009/0070413 A1 | 3/2009 | Priyadarshan et al. |
| 2009/0089448 A1 | 4/2009 | Sze et al. |
| 2009/0100356 A1 | 4/2009 | Kujda |
| 2009/0125799 A1 | 5/2009 | Kirby |
| 2009/0158134 A1 * | 6/2009 | Wang ................ G06F 17/211 715/222 |
| 2009/0158141 A1 | 6/2009 | Bauchot et al. |
| 2009/0177996 A1 | 7/2009 | Hunt et al. |
| 2009/0189890 A1 | 7/2009 | Corbett et al. |
| 2009/0228782 A1 | 9/2009 | Fraser |
| 2009/0238279 A1 | 9/2009 | Tu |
| 2009/0307428 A1 | 12/2009 | Schmieder et al. |
| 2009/0307571 A1 | 12/2009 | Gowda et al. |
| 2009/0307603 A1 | 12/2009 | Gowda et al. |
| 2010/0027663 A1 | 2/2010 | Dai et al. |
| 2010/0049785 A1 | 2/2010 | Stoyanov et al. |
| 2010/0115056 A1 | 5/2010 | Tuli |
| 2010/0115454 A1 | 5/2010 | Tuli |
| 2010/0194753 A1 | 8/2010 | Robotham et al. |
| 2010/0269152 A1 | 10/2010 | Pahlavan et al. |
| 2010/0281402 A1 | 11/2010 | Staikos et al. |
| 2010/0306643 A1 | 12/2010 | Chabot et al. |
| 2011/0029904 A1 | 2/2011 | Smith et al. |
| 2011/0074765 A1 | 3/2011 | Oterhals et al. |
| 2011/0078333 A1 * | 3/2011 | Jakubowski ........ H04L 67/1095 709/248 |
| 2011/0078593 A1 | 3/2011 | Matsui |
| 2011/0080955 A1 | 4/2011 | Shi et al. |
| 2011/0145695 A1 | 6/2011 | Matsui |
| 2011/0197126 A1 | 8/2011 | Arastafar |
| 2011/0225520 A1 | 9/2011 | Watanabe |
| 2011/0231746 A1 | 9/2011 | Rohrabaugh et al. |
| 2011/0258532 A1 * | 10/2011 | Ceze ................ G06F 17/30902 715/234 |
| 2011/0287750 A1 | 11/2011 | Watanabe et al. |
| 2011/0302514 A1 | 12/2011 | Rinaudo et al. |
| 2012/0001832 A1 | 1/2012 | Braghis et al. |
| 2012/0022942 A1 | 1/2012 | Holloway et al. |
| 2012/0030560 A1 | 2/2012 | Yano |
| 2012/0047444 A1 | 2/2012 | Adar et al. |
| 2012/0054166 A1 | 3/2012 | Jeremias |
| 2012/0084663 A1 | 4/2012 | Momchilov et al. |
| 2012/0102416 A1 | 4/2012 | Chmiel |
| 2012/0110435 A1 | 5/2012 | Green |
| 2012/0117145 A1 * | 5/2012 | Clift ................ A63F 13/12 709/203 |
| 2012/0131441 A1 | 5/2012 | Jitkoff et al. |
| 2012/0151094 A1 | 6/2012 | Cooke |
| 2012/0151308 A1 | 6/2012 | Falkenberg |
| 2012/0159308 A1 | 6/2012 | Tseng et al. |
| 2012/0188280 A1 | 7/2012 | Charlesbois et al. |
| 2012/0191735 A1 | 7/2012 | Duff et al. |
| 2012/0215834 A1 | 8/2012 | Chen et al. |
| 2012/0254727 A1 | 10/2012 | Jain et al. |
| 2012/0254780 A1 | 10/2012 | Mouton et al. |
| 2012/0256949 A1 | 10/2012 | Treat et al. |
| 2012/0265802 A1 | 10/2012 | Shen et al. |
| 2013/0050249 A1 | 2/2013 | Grabowski et al. |
| 2013/0080895 A1 | 3/2013 | Rossman |
| 2013/0145259 A1 | 6/2013 | Kiefer, III et al. |
| 2013/0159923 A1 | 6/2013 | French et al. |
| 2013/0185633 A1 | 7/2013 | Bunker et al. |
| 2013/0212462 A1 * | 8/2013 | Athas ................ H04L 67/10 715/234 |
| 2013/0219024 A1 | 8/2013 | Flack |
| 2014/0012685 A1 | 1/2014 | Le Chevalier |

(56) References Cited

U.S. PATENT DOCUMENTS

| | | | |
|---|---|---|---|
| 2014/0032964 A1 | 1/2014 | Neerincx | |
| 2014/0053054 A1 | 2/2014 | Shen | |
| 2014/0059421 A1* | 2/2014 | Chibisov | G06F 17/2247 |
| | | | 715/234 |
| 2014/0129920 A1 | 5/2014 | Sheretov et al. | |
| 2014/0136942 A1 | 5/2014 | Kumar et al. | |
| 2014/0136951 A1 | 5/2014 | Kumar et al. | |
| 2014/0136971 A1 | 5/2014 | Kumar et al. | |
| 2014/0136973 A1 | 5/2014 | Kumar et al. | |
| 2014/0281894 A1 | 9/2014 | Maity et al. | |
| 2014/0281896 A1 | 9/2014 | Wiitala et al. | |
| 2014/0380151 A1 | 12/2014 | Aganovic | |
| 2015/0026566 A1 | 1/2015 | Hui et al. | |
| 2015/0089355 A1 | 3/2015 | Peng et al. | |
| 2015/0113157 A1 | 4/2015 | Chan et al. | |
| 2015/0117515 A1 | 4/2015 | Fu et al. | |
| 2015/0121193 A1 | 4/2015 | Beveridge et al. | |
| 2015/0145749 A1 | 5/2015 | Inamoto et al. | |
| 2015/0193409 A1 | 7/2015 | Portnoy et al. | |
| 2015/0229569 A1 | 8/2015 | Hui et al. | |
| 2015/0242522 A1 | 8/2015 | Lin et al. | |
| 2015/0271188 A1 | 9/2015 | Call | |
| 2015/0293929 A1 | 10/2015 | Namgung | |
| 2015/0310126 A1 | 10/2015 | Steiner et al. | |
| 2015/0331886 A1 | 11/2015 | Chen et al. | |
| 2016/0162597 A1 | 6/2016 | Karppanen | |
| 2017/0011017 A1 | 1/2017 | Jain | |

FOREIGN PATENT DOCUMENTS

| | | |
|---|---|---|
| JP | 2011-123697 | 6/2011 |
| JP | 2011-524033 | 8/2011 |

OTHER PUBLICATIONS

Kokkevis, Vangelis "GPU Accelerated Compositing in Chrome" The Chromium Projects, 2012, 9 pages.

Anonymous, "ShrinkTheWeb (STW) Website Previews Plugin", http://web.archive.org/web/20120710154658/http://wordpress.org/extend/plugins/shrinktheweb-website-preview-plugin/screenshots/, Jul. 10, 2012, 3 pages.

Anonymous, "ShrinkTheWeb—Website Previews API Documentation", http://web.archive.org/web/20121029152521/http://www.shrinktheweb.com/uploads/STW_API_Documentation.pdf, Oct. 29, 2012, 4 pages.

Esteveo, Martin, "Tiling in DirectX: Part 1", from gamedev.net, Jul. 24, 2000, 5pgs.

Esteveo, Martin, "Tiling in OpenGL", from gamedev.net, Dec. 12, 2000, 6 pgs.

Pcworld, Hands-on: Chrome Remote Desktop app for Android makes remote PC access easy, available at http://www.pcworld.com/article/2144562/hands-on-chrome-remote-desktop-app-for-android-makes-remote-access-easy.html, published Apr. 16, 2014 (last accessed May 22, 2014), 4 pages.

Microsoft Windows Help, Connect to another computer using Remote Desktop Connection, available at http://windows.microsoft.com/en-us/windows/connect-using-remote-desktop-connection#connect-using-remote-desktop-connection=windows-7 (last accessed May 22, 2014), 2 pages.

Bahl et al., "Advancing the State of Mobile Cloud Computing", MCS' 12, Jun. 25, 2012, pp. 21-27.

Björk et al., "West: A Web Browser for Small Terminals", CHI Letters, 1999, vol. 1, No. 1, pp. 187-196.

Buyukkokten et al., "Power Browser: Efficient Web Browsing for PDAs", CHI Letters, 2000, vol. 2, No. 1, Apr. 1-6, 2000, pp. 430-437.

Deboosere et al., "Thin Client Computing Solutions in Low- and High-Motion Scenarios", Third International Conference on Networking and Services (ICNS'07), 2007, pp. 6.

Delwadia, Vipul, "RemoteME: Experiments in Thin-Client Mobile Computing", Thesis for Master of Science in Computer Science, Victoria University of Wellington, 2009, pp. 114.

Dyken et al., "A Framework for OpenGL Client-Server Rendering", 2012 IEEE 4th International Conference on Cloud Computing Technology and Science, 2012, pp. 729-734.

Fox et al., "Experience With Top Gun Wingman: A Proxy-Based Graphical Web Browser for the 3Com PalmPilot", Middleware'98, Session 9, 1998, pp. 407-424.

Freytag et al., "Resource Adaptive WWW Access for Mobile Applications", Computers & Graphics, 1999, vol. 23, pp. 841-848.

Han et al., "Dynamic Adaptation in an Image Transcoding Proxy for Mobile Web Browsing", IEEE Personal Communications, Dec. 1998, pp. 8-17.

Ku et al., "The Amazon Kindle Fire: Benchmarked, Tested, and Reviewed", http://www.tomshardware.com/reviews/amazon-kindle-fire-review,3076.html, Nov. 23, 2011, pp. 37.

Stokes, Jon, "Amazon's Silk is More Than Just a Browser: It's A Cloud OS for the Client", http://web.archive.org/web/20121217033708/http://www.wired.com/insights/2011/09/amazon-silk,. Sep. 28, 2011, pp. 4.

Tendulkar et al., "Abusing Cloud-Based Browsers for Fun and Profit", ACSAC '12, Dec. 3-7, 2012, pp. 219-228.

Wang et al., "Accelerating the Mobile Web with Selective Offloading", MCC 13, Aug. 12, 2013, pp. 45-50.

Weintraub, Levi, "How WebKit Renders the Web", Fluent Conference, May 31, 2012, pp. 67. http://www.slideshare.net/naseemh/airbnb-tech-talk.

Xiao et al., "Browsing on Small Displays by Transforming Web Pages into Hierarchically Structured Subpages", ACM Transactions on the Web, Jan. 2009, vol. 3, No. 1, pp. 36.

Zavou et al., "Exploiting Split Browsers for Efficiently Protecting User Data", CCSW' 12, Oct. 19, 2012, pp. 37-42.

Garsiel et al., "How Browsers Work: Behind the Scenes of Modern Web Browsers", http://www.html5rocks.com/en/tutorials/internals/howbrowserswork/. Aug. 5, 2011, pp. 52.

Grosskurth et al., "Architecture and Evolution of the Modern Web Browser", http://grosskurth.ca/papers/browser-archevol-20060619.pdf, Jun. 20, 2006, pp. 24.

Herostratus' Legacy, "Composited Video Support in WebKit-GTK+", https://blogs.igalia.com/vjaquez/2013/07/26/composited-video-support-in-webkitqtk/, Jul. 26, 2013, pp. 8.

Stefanov, Stoyan, "Rendering: Repaint, Reflow/Relayout, Restyle", http://www.phpied.com/rendering-repaint-reflowrelayout-restyle/, Dec. 17, 2009, pp. 11.

Wiltzius, Tom, "Accelerated Rendering in Chrome", http://www.html5rocks.com/en/tutorials/speed/layers/, Mar. 11, 2013, pp. 11.

Xiao et al., "Web Page Adaptation for Small Screen Mobile Device: A New P2P Collaborative Deployment Approach", First International Conference on Intelligent Networks and Intelligent Systems, 2008, pp. 191-196.

Ranganathan et al., "A Lossless Image Compression Algorithm Using Variable Block Size Segmentation", IEEE Transactions on Image Processing, Oct. 1995, vol. 4, No. 10, pp. 1396-1406.

Vaisey et al., "Image Compression with Variable Block Size Segmentation", IEEE Transactions on Signal Processing, Aug. 1992, vol. 40, No. 8, pp. 2040-2060.

\* cited by examiner

DISTRIBUTED CONTENT BROWSING SYSTEM USING TRANSFERRED HARDWARE-INDEPENDENT GRAPHICS COMMANDS

CROSS-REFERENCE TO CONCURRENTLY-FILED APPLICATIONS

The present application's Applicant is concurrently filing the following U.S. patent applications on May 22, 2014:

| U.S. Application Ser. No. | Title |
| --- | --- |
| 14/285,317 | EMULATION OF CONTROL RESOURCES FOR USE WITH CONVERTED CONTENT PAGES |
| 14/285,492 | DELIVERY AND DISPLAY OF PAGE PREVIEWS USING HARDWARE-INDEPENDENT GRAPHICS COMMANDS |
| 14/281,200 | ON-DEMAND DETECTION OF USER INPUT TARGETS |
| 14/285,060 | CONVERSION OF CONTENT PAGES INTO SETS OF TILES FOR DELIVERY TO AND EFFICIENT DISPLAY ON USER DEVICES |
| 14/285,275 | TRANSFERRING DAMAGED PORTIONS OF A RENDERED PAGE TO A USER DEVICE |
| 14/285,334 | UPDATING DAMAGED PORTIONS OF RENDERED PAGES THAT CONTAIN VIDEO CONTENT |
| 14/285,300 | SPLIT BROWSER ARCHITECTURE CAPABLE OF DELIVERING VIDEO STREAMS TO USER DEVICES |
| 14/285,531 | BANDWIDTH REDUCTION THROUGH DELIVERY OF HARDWARE-INDEPENDENT GRAPHICS COMMANDS FOR PORTIONS OF CONTENT PAGES |
| 14/285,557 | CACHING OF CONTENT PAGE LAYERS |
| 14/285,442 | SPLIT BROWSER ARCHITECTURE CAPABLE OF DELIVERING LAYERS TO USER DEVICES |
| 14/285,504 | SPLIT BROWSER ARCHITECTURE CAPABLE OF DELIVERING GRAPHICS COMMANDS TO USER DEVICES |

The disclosures of the above-referenced applications are hereby incorporated by reference.

BACKGROUND

When a user requests a web page or other content page via a browser, the user typically experiences a noticeable delay before the page is fully or even partially displayed. Various factors can contribute to this delay. These factors include, for example, (1) the speed of the wireless or wired connection between the user's device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user's device. When the delay is significant (e.g., several seconds or more), the task of browsing can be frustrating for users.

Various methods exist for reducing the delay experienced by users. Some methods include the use of caching proxy servers, which store recently-retrieved versions of content and provide the content to users faster than origin servers. For example, a caching proxy may be located closer (in either a geographic or networking sense) to a client device, or the caching proxy may have a faster network connection to the client device or the origin server. Origin servers may also deploy certain content onto content delivery network ("CDN") servers. Client devices requesting the content may be directed to the closest CDN server or to a CDN server that can otherwise provide the requested content faster than the origin server. Other methods of reducing the delay experienced by users include the use of proxy servers or other intermediary systems that compress or re-format content. Such processed content may be transferred to client devices faster, or may require less processing by the client devices to render the content.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
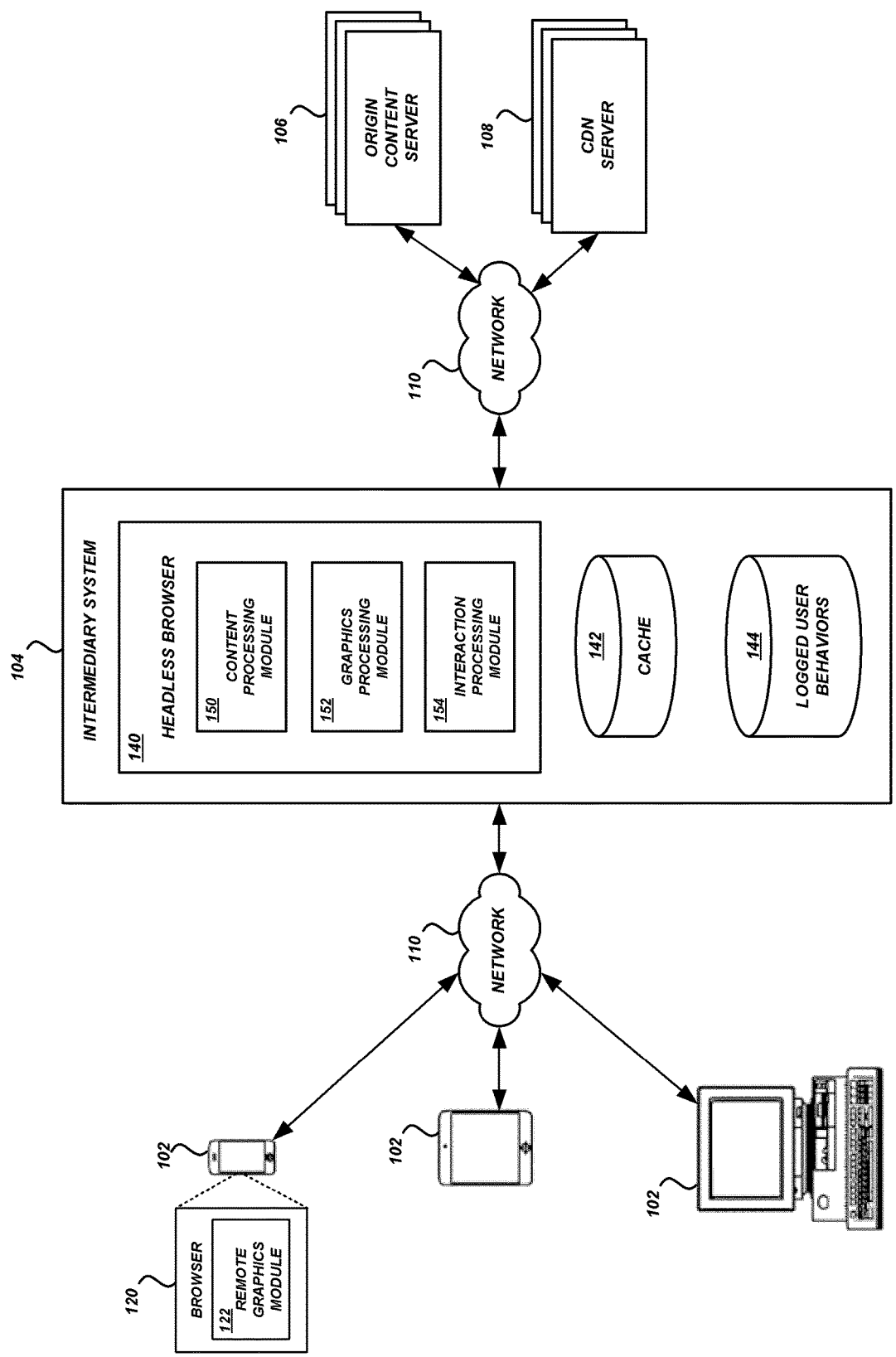
FIG. 1 illustrates a content delivery environment with an intermediary system that processes content and generates hardware-independent graphics commands for execution on user devices according to some embodiments.

The present disclosure involves an architecture in which the functions of a network content browsing system (e.g., a "web browser" application) are distributed among a browser component running on a server and a browser component running on a user device. The server-based browser component can obtain content and generate graphics commands that can be executed to display a representation of the content. The graphics commands may not be markup commands, such as Hypertext Markup Language ("HTML") commands, but may instead be hardware-independent graphics commands for painting to a display, such as vector graphics commands that are not device-specific or graphics processing unit ("GPU") specific (e.g., they can be executed on a variety of different devices and in different operating environments as long as the appropriate graphics library is present). For example, the hardware-independent graphics commands may be software-based graphics commands targeted at a particular multi-platform software library or application programming interface ("API") that provides abstraction from specific hardware requirements. The sever-based browser component does not need to execute the graphics commands to display the content, but may instead (or additionally) provide the graphics commands to the browser component running on the user device. In this configuration, the server-based browser component may be referred to as a "headless browser," and the browser component running on the user device may be referred to as a "client browser." The client browser can execute the graphics commands to display requested content without the content processing that would normally be required on the user device.

Conventional browser applications executing on a user device typically request content at a particular network address (e.g., www.abc.xyz) directly from an origin server at the network address, indirectly from a content delivery network ("CDN") server configured to provide content on behalf of the origin server, via an intermediary system such as a proxy, or though some other route. The requested content may be received in the form of an HTML file, which is then parsed by the browser application to identify any objects (e.g., images, videos, style sheets, script files, etc.) referenced by the HTML file. The referenced objects are then retrieved in a manner that is similar or identical in many respects to the retrieval of the HTML file. The browser application constructs a Document Object Model ("DOM") tree based on the parsed HTML file and the referenced objects. The DOM tree includes nodes for each element of the requested content (e.g., individual HTML tags, referenced objects, scripts, etc.). A render tree is constructed using style information (e.g., from referenced cascading style sheets) and the visual elements from the DOM tree in the order in which they are to be displayed. The purpose of the render tree is to enable painting of the elements in the correct order. The render tree is traversed and a paint command is executed for each node in order to display content on the screen.

Performance of such a conventional browser application is typically dependent upon the latencies and resource requirements associated with each of the processes summarized above. If a user device has a low-bandwidth network connection, then retrieval of the content may introduce substantial latency before much of the processing to be performed on the user device may begin. If a user device does not have enough computing resources (e.g., CPU capacity, available memory, etc.), the processing of content after it is retrieved may introduce substantial latency before or during painting of the content to the user device display.

Some aspects of the present disclosure relate to splitting the graphics pipeline of a browser application among server-based and client-based browser components (e.g., between a headless browser and a client browser). The server (or servers) on which a headless browser instance is running may have access to a network connection that is substantially faster than the network connection available to the user device, and can therefore retrieve content much more quickly than the user device. Alternatively, or in addition, the server(s) may have substantially more computing resources than the user device, and may therefore perform the content processing summarized above and described in greater detail below much more quickly and efficiently than the user device. As a result of the faster network connection and/or greater available computing resources, a headless browser instance running on a server may be able to produce paint commands faster than a conventional browser application executing on a user device. The paint commands can be transmitted to a user device in the form of hardware-independent graphics commands, where they can be executed by a client browser instance to display requested content. Advantageously, the transmission of such hardware-independent graphics commands to a user device may require less bandwidth than the retrieval of unprocessed content items by the user device, further reducing the time required for the user device to receive and display requested content, and further improving user-perceived performance.

In some embodiments, the hardware-independent graphics commands that are generated by the headless browser are vector graphics commands, such as Skia commands or OpenGL commands. The vector graphics commands may be transmitted to a client browser running on a user device. For example, Skia commands for displaying a content page (or some portion thereof) may be recorded as a Skia SkPicture, which can be stored and/or transmitted to a client browser. As long as the client browser has access to the proper graphics library to execute them, the vector graphics commands may be executed by the client browser to display a representation of the requested content that is identical (or substantially identical) to the representation that would have been displayed if the client browser retrieved and processed the requested content locally. For example, users may be able to zoom the display of the user device in on text or vector graphic objects without any pixilation of the display. As another example, users may pan and scroll the content, highlight and copy text, etc.

Additional aspects of the present disclosure relate to updating the display of content to account for any changes to the display (e.g., to update areas which are no longer current or valid; such areas may be referred to as "damaged" or "dirty" areas). Rather than generating, transferring, and executing hardware-independent graphics commands to re-paint the entire display, the display may be updated using hardware-independent graphics commands for the specific object, area, or layer that is damaged. In some embodiments, interaction information regarding user actions performed on the content (e.g., scrolling, zooming, clicking, etc.) may be transmitted to the headless browser. The headless browser may then perform the same actions to its representation of the requested content, determine which portion(s) of the display has changed (if any), and generate hardware-independent graphics commands for the changed portion(s) only, rather than for the entire content page or currently displayed portion thereof. The hardware-independent graphics commands may then be provided to the user device, which can execute them to update the representation of content that is displayed on the user device. For example, a user may move the mouse cursor over a particular object, such as a button, of a web page. The "onmouseover" event handler for that particular object may be associated with code that modifies the appearance of the object. The headless browser can execute the code and generate hardware-independent graphics commands to modify the appearance of the object accordingly (e.g., draw a rectangle with certain properties at a particular screen location identified by specific coordinates). The hardware-independent graphics commands can be transmitted to the client browser, which executes the graphics commands and draws the appropriate rectangle.

Further aspects of the present disclosure relate to separating content into layers to facilitate the update features described above and in greater detail below, and to provide additional bandwidth conservation functionality to the client browser. A content page may include multiple (e.g., two or more) distinct areas which can or should be handled independently from one another. The distinct areas may correspond to different visual objects, frames, files, or the like. The headless browser can define a layer for each of the distinct areas (or for combinations thereof), and can produce a separate set of hardware-independent graphics commands (e.g., a separate SkPicture) for each layer. In some embodiments, two or more layers may partially or completely overlap in two-dimensional space (e.g., the layers may include the same area defined by the coordinates $(x_1, y_1)$ to $(x_2, y_2)$). Individual layers may be associated with layout information that indicates the order of the layers in a third dimension (e.g., a z-index). In some embodiments, no layers of a content page overlap. In one example content page, the page may have a header area and a separate body area. The body area may be scrollable or otherwise changeable, while the header area is to remain stationary or unchanged. Rather than requiring updated Skia commands to be generated in response to every scrolling event associated with the body area in order to maintain the appearance of a stationary header area, the two areas may be defined as two separate SkPictures. The client browser can be configured to compose the separate SkPictures into a single display, while allowing users to interact with the content represented by each SkPicture separately. In this example, a user may scroll the body area, and only the portion of the display corresponding to the body area may change. In some embodiments, an SkPicture corresponding to the body area in its entirety may be provided to the client browser, reducing or eliminating the need for any updated Skia commands to be generated by the headless browser in response to scrolling interactions.

Still further aspects of the present disclosure relate to caching, at a server-side cache and/or a client-side cache, individual layers (e.g., the SkPictures or other discrete sets of hardware-independent graphics commands for individual layers). Individual layers may be assigned various properties, such as an identifier and a time-to-live ("TTL") value. Illustratively, the identifier may be based on a hash of the graphics commands for the layer, layout information regarding the size and position of the layer on the composed display of the content page, etc. When a client browser receives layers for a requested content page, the client browser can store the layers in a client-side cache in addition to executing the graphics commands. In response to subsequent requests for the content page, the headless browser can provide identifiers of layers that are present in the client-side cache, and can thereby reduce bandwidth usage by avoiding the transmission of graphics commands that are already present at the client. In some embodiments, the headless browser can provide identifiers of some or all layers of a content page without prior knowledge of which layers may be cached at the client, and the client browser can return a cache miss notification or otherwise retrieve the layers that are not in the client-side cache. In some embodiments, cached layers for one page may be re-used for other pages. For example, multiple (e.g., two or more) pages of a particular domain may include the same header or other portion. The client browser can obtain from the client-side cache the layer corresponding to that portion, originally received in response to a request for a first page, even when the client browser is displaying a second page for the first time. In some embodiments, the server may cache a layer in a server-side cache in response to a request from a first client browser, and may provide the cached layer (or unique layer identifier) to a second client browser, thereby reducing latency by avoiding the repeated retrieval of content pages and generation of hardware-independent graphics commands.

Although aspects of the embodiments described in the disclosure will focus, for the purpose of illustration, on a distributed browsing system with separate server-based and client-based browser components designed specifically to work in conjunction with one another (e.g., a headless browser instance running on a server and a corresponding client browser instance running on a user device), one skilled in the art will appreciate that the techniques disclosed herein may be applied to any number of services, processes, or applications. In some embodiments, an existing browser application that runs on a user device may be configured to receive hardware-independent graphics commands from a server in lieu of unprocessed content files. For example, a browser plug-in or extension may be installed on a user device to facilitate communication with a headless browser, receive Skia commands, and execute the Skia commands, thereby bypassing the parsing/DOM tree construction/rendering processes that would normally be performed by the browser application. In some embodiments, browsers executing on user devices may be designed to receive either conventional content files or hardware-independent graphics commands (or a combination thereof). For example, the browser may determine whether to request content files or hardware-independent graphics commands based on current conditions and performance metrics, data regarding prior browsing sessions, or the like. Alternatively, or in addition, an intermediary system may determine whether to provide content files or hardware-independent graphics commands based on current conditions, performance metrics, prior browsing sessions, or the like.

Furthermore, although the examples in the present disclosure focus on the generation, transmission, and execution of Skia commands, the systems and processes herein may be used with any hardware-independent graphics commands or other non-device-specific, non-GPU-reliant graphics commands as long as both the client browser (or browser extension) and headless browser each have access to the necessary graphics processing components and libraries.

Various aspects of the disclosure will now be described with regard to certain examples and embodiments, which are intended to illustrate but not limit the disclosure.

System Components

FIG. 1 illustrates an example network environment in which features can be implemented for processing content pages on an intermediary system and generating hardware-independent graphics commands for execution by a user device. The network environment shown in FIG. 1 includes various user devices 102, an intermediary system 104, and various content sources, including origin content servers 106 and content delivery network ("CDN") servers 108. The system components may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a client browser application 120 to communicate via the network 110 with other computing systems, such as the intermediary system 104 or content sources 106 and 108, in order to request and display content.

Illustratively, a user may use a client browser 120 to request network-accessible content (e.g., content pages, images, video, etc.) hosted or provided by a content source, such as an origin content server 106 or a CDN server 108. The user device 102 or client browser 120 may be associated with the intermediary system 104 or otherwise configured to request the content through, and receive hardware-independent graphics commands from, the intermediary system 104 rather than communicating directly with the content source. The client browser 120 may include a remote graphics module 122 that receives remotely-generated hardware-independent graphics commands, such as Skia commands generated by the intermediary system 104. The remote graphics module 122 (or some other module of the client browser 120) can execute the remote-generated hardware-independent graphics commands to display a representation of the requested content on the user device 102. Advantageously, the remote graphics module 122 may facilitate the display of graphical representations of requested content on the user device 102 without requiring the user device 102 to receive content files (e.g., HTML files, JPEG images, etc.) directly or indirectly from content sources 106 and 108.

In some embodiments, the browser application running on the user device 102 may be a conventional web browser that is not specifically designed or configured to execute remotely-generated graphics commands and other display commands. For example, the browser may use or otherwise be associated with a remote graphics module 122 that is not integrated with the browser, such as a browser add-in or extension. In some embodiments, applications other than a browser may include or use a remote graphics module 122 (or some similar module) to execute graphics commands generated by an intermediary system 104. For example, content aggregators or other specialized content display applications for mobile devices (e.g., Flipboard) may utilize a remote graphics module 122.

The intermediary system 104 can be a computing system configured to retrieve content on behalf of user devices 102 and generate hardware-independent graphics commands for execution by the user devices 102. For example, the intermediary system 104 can be a physical server or group of physical servers that may be accessed via the network 110.

In some embodiments, the intermediary system 104 may be a proxy server, a system operated by an internet service provider (ISP), and/or some other device or group of devices that retrieve content on behalf of user devices 102.

The intermediary system 104 may include various modules, components, data stores, and the like to provide the content retrieval and processing functionality described herein. For example, the intermediary system 104 may include a server-based browser application or some other content rendering application to process content retrieved from content sources. Such a content rendering application may be referred to as a "headless browser" 140. A headless browser 140 does not (or is not required to) cause display of content by a graphical display device of the server on which the headless browser 140 is executing. In some embodiments, the headless browser 140 can provide hardware-independent graphics commands to separate user devices 102. Illustratively, the headless browser 140 may obtain requested content from an origin content server 106 and/or CDN server 108, obtain additional items (e.g., images and executable code files) referenced by the requested content, execute code (e.g., JavaScript) that may be included in or referenced by the content, generate hardware-independent graphics commands to display a graphical representation of the content, and transmit the hardware-independent graphics commands to the user device 102. By performing some or all of these operations on the intermediary system 104 rather than the user device 102, the substantial computing resources and high-speed network connections typically available to network-based server systems may be leveraged to perform the operations much more quickly.

The headless browser 140 may include various modules to provide the functionality described above and in greater detail below. For example, the headless browser 140 may include: a content processing module 150 that parses content files and generates a DOM tree and/or render tree representation of the content; a graphics processing module 152 that receives the DOM/render tree representation and generates hardware-independent graphics commands (e.g., Skia commands) to render a graphical representation of the content on a user device 102; and an interaction processing module 154 that communicates with the client browser 120 to receive information regarding interactions with the content on the user device 102 and to update the graphical representation of the content if necessary. In some embodiments, a headless browser 140 may include additional or fewer modules than those shown in FIG. 1.

The intermediary system 104 may include additional modules, components, data stores, and the like to provide the features described above and in greater detail below. For example, the intermediary system 104 may include a cache 142 that stores content items received from content sources 106 and 108, hardware-independent graphics commands generated by the headless browser 140, and the like. The intermediary system 104 may also include a logged user behaviors data store 144 that stores information about user requests and interactions with content.

In some embodiments, the cache 142 may store representations of content pages generated by the headless browser 140, together with any hardware-independent graphics commands or interactivity instructions, for a predetermined period of time after the content page request or after connection between the user device and the intermediary system has terminated. Accordingly, if the user of the user device requests the content page again within the predetermined time period, the hardware-independent graphics commands and any other data can be retrieved from the cache 142 and delivered to user device 102 without the need to re-generate the hardware-independent graphics commands. In some embodiments, persistence of hardware-independent graphics commands in the cache 142 can reduce user-perceived page load times for recently requested pages. For instance, if a user device 102 runs out of battery power or otherwise powers down in the middle of a browsing session, the hardware-independent graphics commands may be quickly re-delivered to the user device 102 upon powering on and reestablishing connection with the intermediary system 104. In some embodiments, interactions stored in the logged user behaviors data store 144 can be used to deliver hardware-independent graphics commands reflecting previous user interactions with the page. In other embodiments, the cache 142 may store hardware-independent graphics commands representing a most recent visual representation displayed on the user device 102.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers 108), application service providers, etc.

Network Interactions and Data Flows

Figure 2:
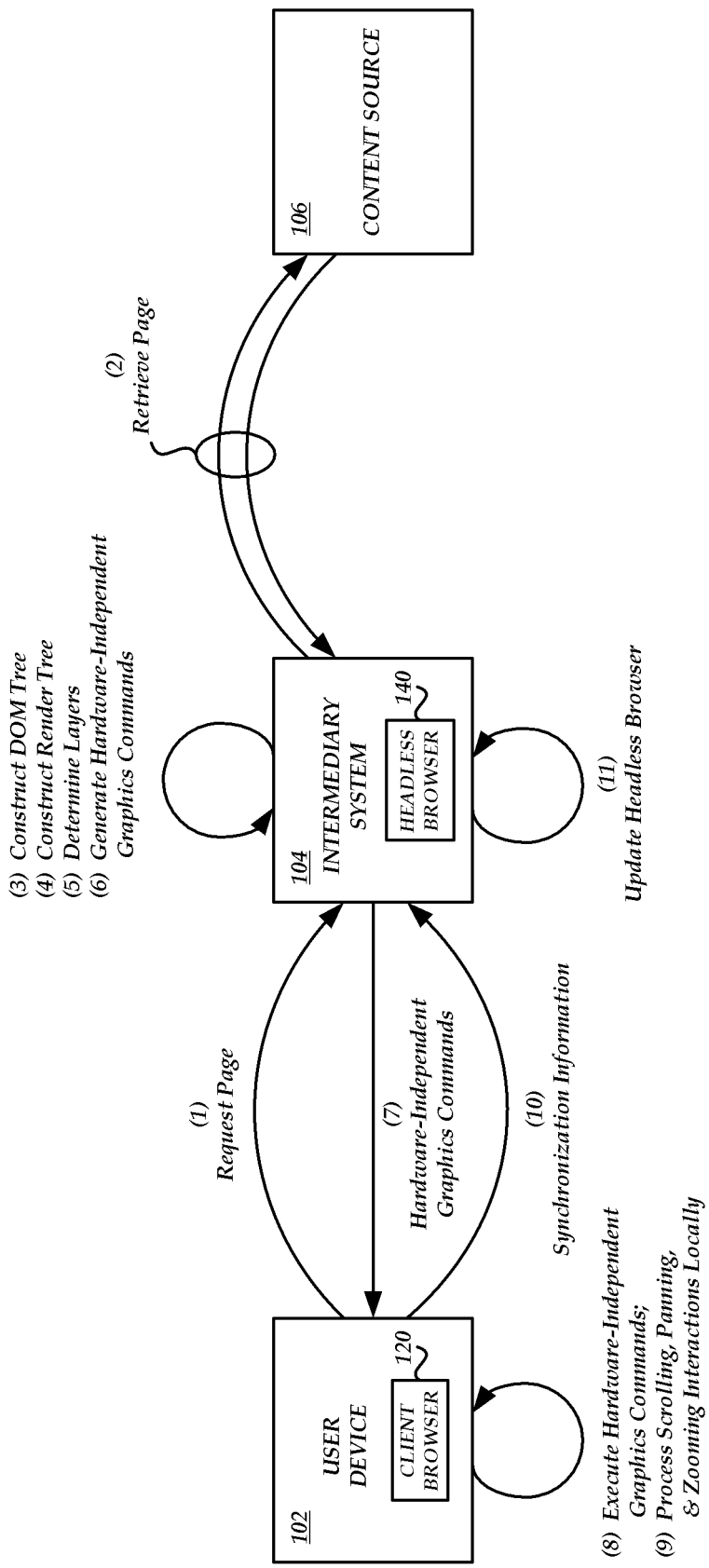
FIG. 2 illustrates example data flows and interactions between a user device, intermediary system, and content source during processing and consumption of content using hardware-independent graphics commands according to some embodiments.
Figure 3:
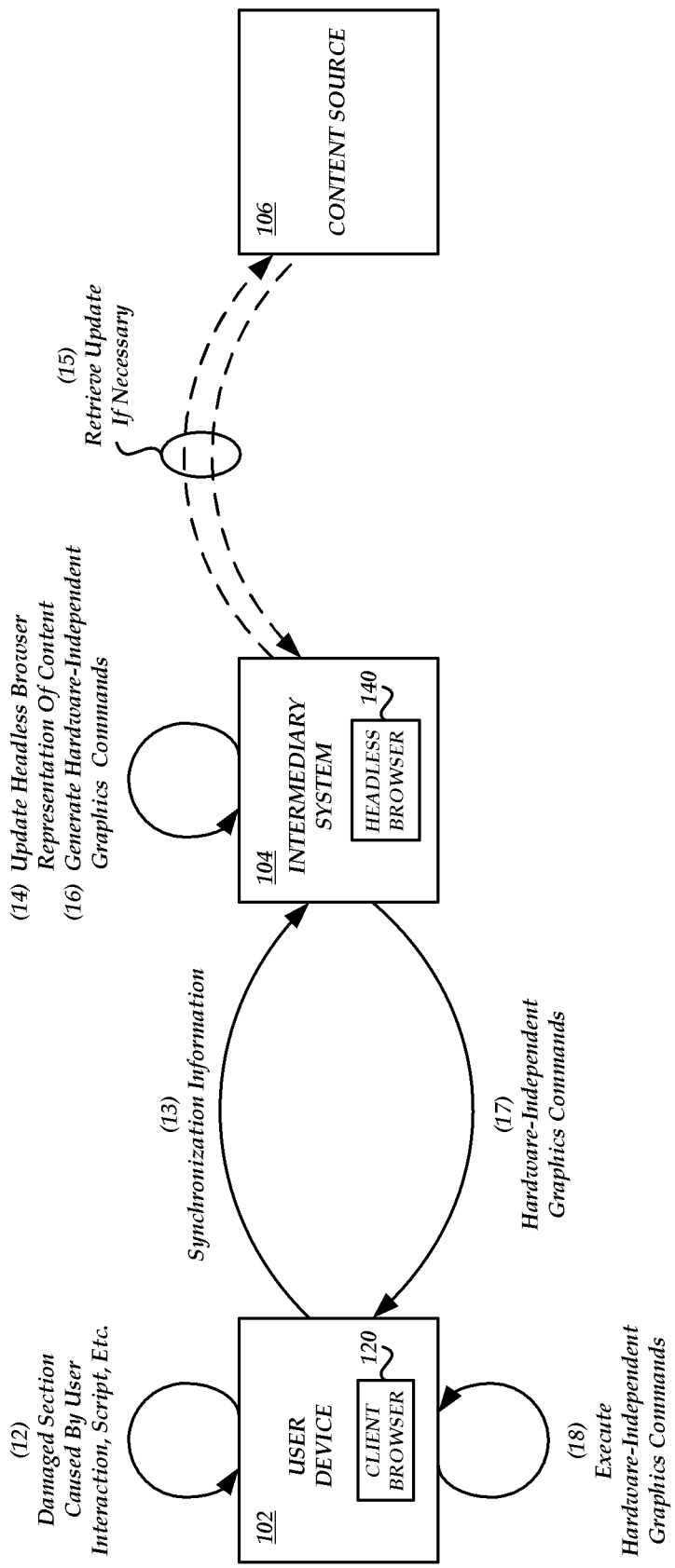
FIG. 3 illustrates additional example data flows and interactions between a user device, intermediary system, and content source during processing and consumption of content using hardware-independent graphics commands according to some embodiments.

FIGS. 2 and 3 show example interactions between a user device 102, an intermediary system 104, and a content source 106 during processing and consumption of content using hardware-independent graphics commands according to some embodiments. The interactions shown in FIGS. 2 and 3 will be discussed with respect to a request for, processing of, and interaction with a content page, such as a web page. Illustratively, the content page may be any content page hosted or offered by a content source, such as a web site. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various external objects and including network addresses of servers from where the external objects may be obtained.

As shown in FIG. 2, a request for a content page may be initiated by a user device 102 and transmitted to an intermediary system 104 at (1). The request may be issued in response to user entry of a network address such as a uniform resource locator ("URL"), activation of a link or bookmark, initiation of a browsing session that causes a request for a predetermined home page, or the like. The request that is transmitted to the intermediary system 104 may be a standardized request, such as an HTML GET request that requests a resource at a particular location. In some embodiments, the request may be a request for hardware-independent graphics commands that may be executed.

The intermediary system 104 may instantiate a headless browser 140 to service the request from the client browser 120. For example, the intermediary system 104 may identify a server with available resources to handle the request, and the request can be routed to that server for processing by a headless browser instance 140. In some embodiments, a headless browser 140 instance may be launched on the intermediary system 104 when a client browser 120 instance is launched on a user device 102 (e.g., a notification may be provided to the intermediary system 104 when a user launches a client browser 120 instance), or in response to some other event. In some embodiments, one or more headless browser instances 140 may already be running on the intermediary system 102 so that they are ready to process requests immediately.

The headless browser 140 instance may retrieve the requested content from an appropriate content source 106 at (2). The content source may be the origin content server, a CDN server, a proxy server, or some other source. In some embodiments, the requested content may already be present in storage of the intermediary system 104. For example, the intermediary system 104 may include a cache 142, as shown in FIG. 1. In such cases, the requested content may be retrieved from the cache 142 rather than the content source 106.

The headless browser 140 may process the content at (3)-(6), as described in greater detail below with respect to FIGS. 4-7. The headless browser 140 can parse the requested content item and construct a DOM tree at (3), and apply styles and other visual configuration properties to the DOM tree elements to construct a render tree at (4).

At (5), the headless browser 140 can determine whether particular elements in the render tree should be rendered separately, or whether all elements of the render tree should be bundled into a single picture. For some content pages, separating elements of a content page into multiple (e.g., two or more) different groups, or "layers," can provide several advantages over bundling every element into a single picture. For example, certain elements may be dynamic in nature, and may therefore require updating more often than other elements, or in response to different events than other elements. Such dynamic elements may therefore be processed by the headless browser 140 separate from other elements of the page. Examples of elements that may trigger creation of a new layer to separate them from the rest of the content page for processing purposes include elements with animation, videos, GIFs, etc. The processing of a render tree into its constituent layers is described in greater detail below with respect to FIGS. 5-7.

At (6), the headless browser 140 can generate hardware-independent graphics commands from the render tree, such as Skia commands for drawing to a canvas. The generated Skia commands can be recorded for future execution or "playback" on the user device 102. For example, Skia commands for some or all of the content page can be recorded as an SkPicture. In some embodiments, Skia commands may be grouped together into separate SkPictures for each separate layer of the content page, determined above. As a result, processing of a single content page may produce any number of individual SkPictures, each including Skia commands to paint a representation of a corresponding portion of the content page. The SkPictures (or other sets of hardware-independent graphics commands) can be packaged for transmission to the requesting user device 102. In some embodiments, SkPictures can be serialized into a format that is suitable for persistent storage (e.g., on a hard disk) or transmission as a file to the requesting user device 102 at (7). In other embodiments, the SkPictures can be transmitted over a TCP connection (or some other connection) in binary form to the user device 102 at (7).

After receiving the hardware-independent graphics commands (e.g., Skia commands) from the intermediary system 102, the user device 102 can execute the commands at (8). For example, the client browser 120 can "play back" the Skia commands in order to paint a representation of the requested content page to a display of the user device 102. Advantageously, the representation of the requested content page that is painted by the user device 102 may be identical or substantially identical (e.g., any differences may not be noticeable to a user) to the representation that would have been displayed by the intermediary system 104 if the headless browser 140 was connected to a display. The representation of the requested content page may also be identical or substantially identical to the representation that would have been generated if the client browser 120 had received the base resource and embedded resources in unprocessed format, and constructed the DOM tree and render tree locally.

A user of the user device 102 can interact with the representation of the content page at (9) in a manner that is similar or identical to any user interaction that may occur with a locally processed version of a content page. For example, the user may scroll, pan, and zoom in on portions of the displayed representation. Because the representation is generated using vector graphics commands, the scrolling, panning, and zooming may be displayed naturally (e.g., no pixilation on vector graphics or text that would not have also been present when interacting with a locally generated version). In some embodiments, the vector graphics commands provided to the client browser 120 may include commands for displaying a representation of the entirety of the requested content page, or some large portion thereof. In such cases, the scrolling, panning, zooming, and certain other interactions may be processed exclusively by the client browser, without any request for or receipt of updated graphics commands from the headless browser 140.

In some embodiments, data regarding user interactions with the representation of content may be provided to the intermediary system 104 at (10) so that the intermediary system 104 can synchronize its representation of the content accordingly. The synchronization data may include data indicating how a user has modified the current display of the representation, such as the coordinates of the current viewport, a zooming factor, or the like. The headless browser 140 can use the synchronization data to update its own representation of the content to mirror the current display on the client browser 120. For example, as described in greater detail below, some user interactions may require updates to the displayed content representation. It may be beneficial or necessary that the headless browser 140 have knowledge of the current (or immediately preceding) display on the client browser 120 so that the headless browser 140 can generate updated hardware-independent graphics commands.

FIG. 3 illustrates additional data flows and interactions that may occur when an update to the representation of requested content is required or otherwise generated. As shown, a user may perform some interaction at (12) that causes a portion of the representation to become damaged or otherwise outdated. For example, a user may perform some interaction that triggers execution of JavaScript to modify the appearance of some portion of the display, as may occur during an "onmouseover" event or an "onblur" event. Synchronization information can be transmitted to the headless browser 140 at (13). The synchronization information may include information regarding which interaction was performed by the user (e.g., where the user clicked or tapped, what the user typed, etc.). In some embodiments, the client browser 120 may have knowledge of which portion of the display has become "damaged" or otherwise out-of-date, and the synchronization data can include an indication of the damaged portion.

At (14), the interaction processing module 154 or some other module or component of the headless browser 140 can update the representation of content on the intermediary system 104. The update can be based on the synchronization information received from the client browser 120. For example, the headless browser 140 may automatically mimic, on the intermediary system 104, a user interaction with the content on the client browser 120. In the examples above, the interaction can trigger JavaScript code, which executes on the headless browser 140 to modify a portion of the display. In some cases, events other than user interactions with the representation of the content on the user device 102 can cause a visual change to the content page executing on the headless browser 140. For example, JavaScript code may execute on the headless browser 140 without any user intervention, animations may execute on the headless browser 140, dynamic updates to the content may be provided to the headless browser 140 by the content source 106, etc. In these and other cases, the visual representation of the current page can be changed on the headless browser 140, which can trigger a process for updating the visual representation of the content page on the client browser 120.

In some cases, a user interaction or some other event may cause retrieval of additional content. For example, if a user activates a link to a different content item, the headless browser 140 may retrieve the linked content item from the appropriate content source 106 at (15). In some embodiments, activation of a link on a client browser 120 may cause transmission of synchronization data including the underlying network address associated with the link. In other embodiments, activation of a link on a client browser 120 causes transmission of synchronization data regarding the location of a mouse cursor (or a user's finger tap) when the mouse button was clicked (or the screen tapped). The headless browser 140 then performs the same action to determine that a link was activated. The headless browser 140 can then access the underlying network address and request the linked content item from the appropriate server 106.

After the requested content is received and processed, the triggered script is executed, or updates to the display are otherwise determined in response to the user interaction or some other event, the headless browser 140 can generate hardware-independent graphics commands at (16) to update the display accordingly. The hardware-independent graphics commands can be transmitted to the client browser 120 at (17), and executed by the client browser 120 at (18). The interactions shown in FIGS. 3 and 4 may be repeated as necessary in order to respond appropriately to user requests and interactions with content representations received from the headless browser 140.

In some embodiments, hardware-independent graphics commands may be generated at (16) to update only a portion of the representation of the content on the client browser 120 (e.g., only the portion of the content page that is visually different), rather than causing repainting of the entire content page. For example, if the content page has been segmented into layers as described in greater detail below, only hardware-independent graphics commands for the layer(s) that have changed may be transmitted to the user device 102; hardware-independent graphics commands for layers which have not changed may not be generated, or may be generated but not transmitted to the user device 102. This can save transmission resources and improve speed when only a portion of the page has changed visually, because fewer hardware-independent graphics commands are transmitted to the client browser 120.

Content Page Processing

Figure 4:
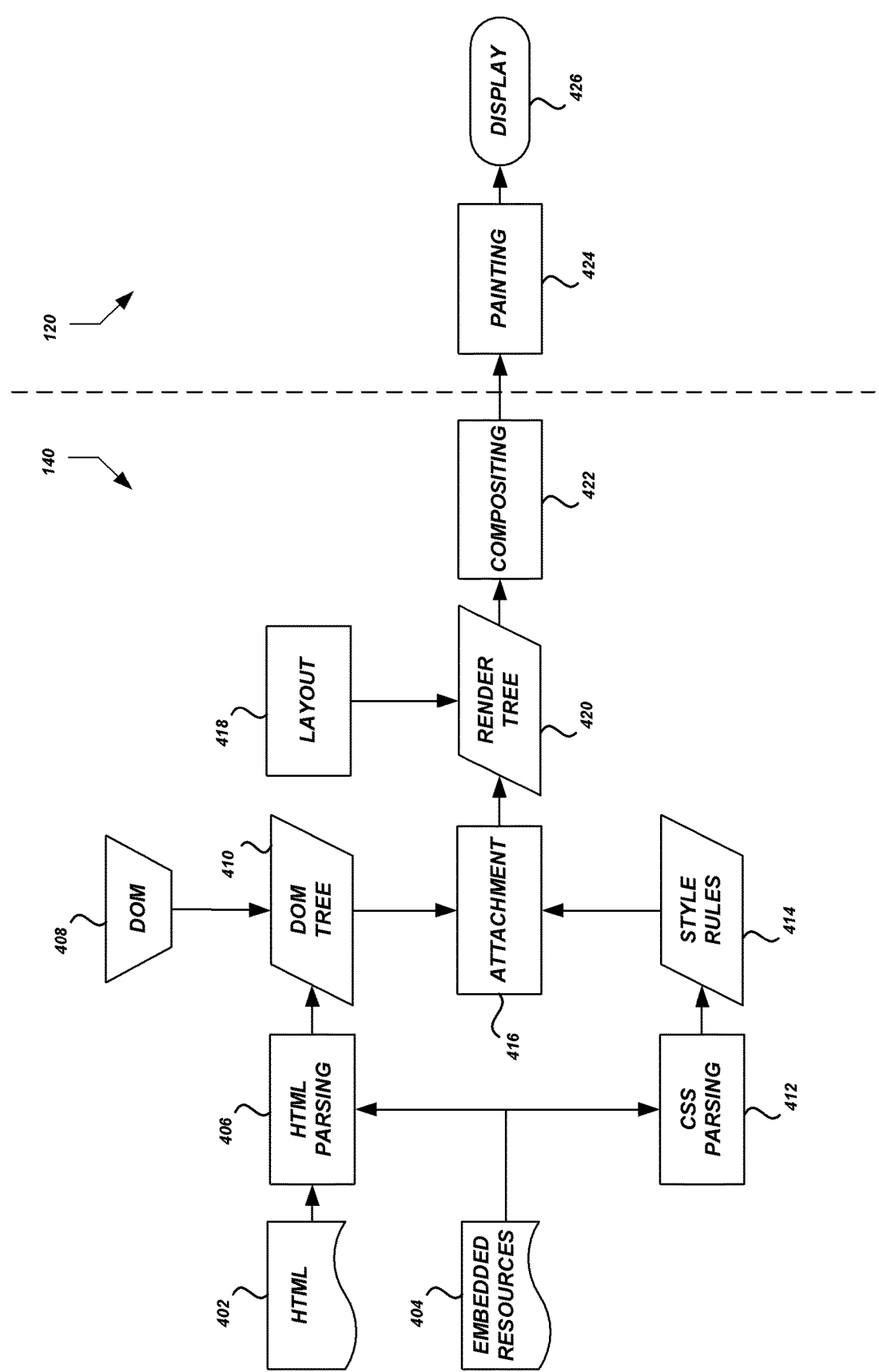
FIG. 4 illustrates example data flows and interactions between browser components during processing of a content page into hardware-independent graphics commands according to some embodiments.

FIG. 4 shows an example processing flow that may be implemented by a headless browser 140 and a client browser 120 to process content pages according to some embodiments. The processes to the left of the dashed line can be performed by the headless browser 140. The processes to the right of the dashed line can be performed by the client browser 120. For example, the graphics processing module 144 of the headless browser 140 can generate hardware-independent graphics commands from the output of the content processing module 150 (e.g., the render tree 420), and the remote graphics module 122 of the client browser 120 can execute the hardware-independent graphics commands to paint a representation of the content page for display. The example processing flow shown in FIG. 4 is illustrative only, and is not intended to be limiting. In some embodiments, some of the processes shown to the left of the dashed line in FIG. 4 may be replaced by other processes or omitted altogether, depending upon the implementation of the content processing module 150 and other system components.

In response to a request for a content page received from a client browser 120, the headless browser 140 can obtain the requested content page. For example, the headless browser 140 can obtain a base resource, such as an HTML file, from a network address provided with the request for the content page, from a local cache, or from some other location as described above. At 406 the content processing module 150 can parse the HTML file in order to identify and retrieve any resources 404 referenced by or embedded in the HTML file. The content processing module 150 can construct the DOM tree 410 based on a DOM definition 408 or specification. For example, the content processing module 150 can convert elements of the embedded resources 404 and HTML file 402 into DOM nodes. At 412 the content processing module 150 can also parse any available style data, such as style data obtained from a referenced CSS file 404 or style data included in the HTML file 402. Parsed style data together with markup instructions in the HTML file 402 can be used create the render tree 420 in a process that may be referred to as attachment 416.

The render tree 420 can include nodes for each element to be displayed. For example, the render tree 420 may include nodes for rectangles and their corresponding visual attributes, such as color and dimensions (e.g., width, height). The rectangles are placed in the render tree 420 in the proper order in which they are to be displayed. The render tree 420 can also undergo a layout process 418. During layout 418, individual nodes in the render tree 420 can be assigned coordinates (or other positional data) indicating where the corresponding shape is to appear when displayed.

In the compositing stage 422 (or prior thereto), the graphics processing module 152 or some other module of the headless browser 140 can determine whether particular nodes of the render tree 420 should be handled separately from the rest of the render tree 420. By separating individual nodes or groups of nodes and handling them separately, any changes to the display of objects corresponding to those nodes may be handled separately from other objects of the content page.

In the painting stage 424, the client browser 120 can execute the hardware-independent graphics commands received from the intermediary system 140. For example, the client browser 120 can use a software library on the user device 102 to execute the commands to paint a representation of the requested content page to a display 426 of the user device 102.

Figure 5:
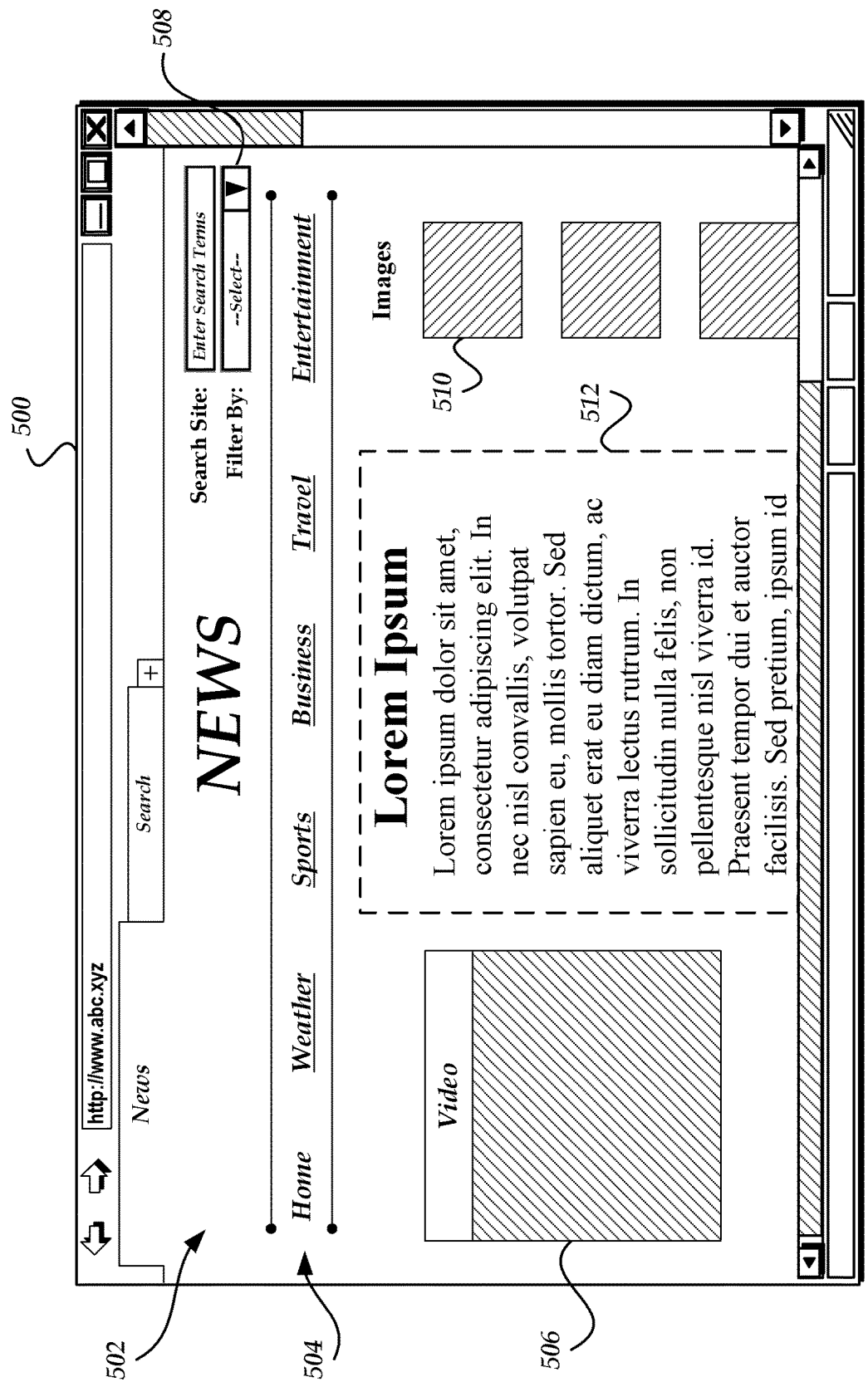
FIG. 5 illustrates an example content page with various layers processed and rendered according to some embodiments.

FIG. 5 shows an example browser interface 500 displaying a representation 502 of a particular content page. The content page may include various objects, such as a header 504 with various links, an embedded video 506, an interactive control 508, an image 510, and a textual content area 512. If the headless browser 140 generates a single set of hardware-independent graphics commands to display a representation of the entire content page, then hardware-independent graphics commands will need to be generated for the entire content page, including all objects displayed on the content page, each time a change to the display of one object is processed. This may be the case even if the display of no other object of the content page is to be changed. For example, if the image 510 is the first image of a multi-image slide show, then hardware-independent graphics commands may need to be generated for the entire representation 502 of the content page each time a new image is to be displayed at the location of the image 510. As another example, if the textual content area 512 is to be scrollable while other objects are to remain stationary (e.g., header 504), then hardware-independent graphics commands may need to be generated for the entire representation of the content page each time the textual content area 512 is scrolled.

To avoid unnecessary processing by the headless browser 140 and to reduce network traffic to the user device 102, one or more of the objects of the content page can be separated into their own portions, referred to herein as "layers." Different layers of a content page can encompass different two-dimensional areas of the content page (e.g., cover different ranges of coordinates without overlapping). In some cases, one layer may partially or completely overlap another layer (e.g., a background layer may be partially overlapped by any number of other layers, each of which may partially or completely overlap other layers, etc.). Hardware-independent graphics commands for individual layers can be generated such that they can be combined into a single representation by the client browser 120, while also allowing repainting of a single layer separately from the other layers of the content page. In this way, the representation of a single object can be updated separately from other objects and without re-processing and/or re-painting of the other objects. In some embodiments, as described above, the hardware-independent graphics commands may be Skia commands. Each individual layer may correspond to a different SkPicture, which includes Skia commands that can be executed to display a representation of the object. Individual SkPictures can be generated, stored, transmitted, executed, and updated independently from other SkPictures, even when multiple SkPictures are used to generate a single display on a user device 102.

Figure 6:
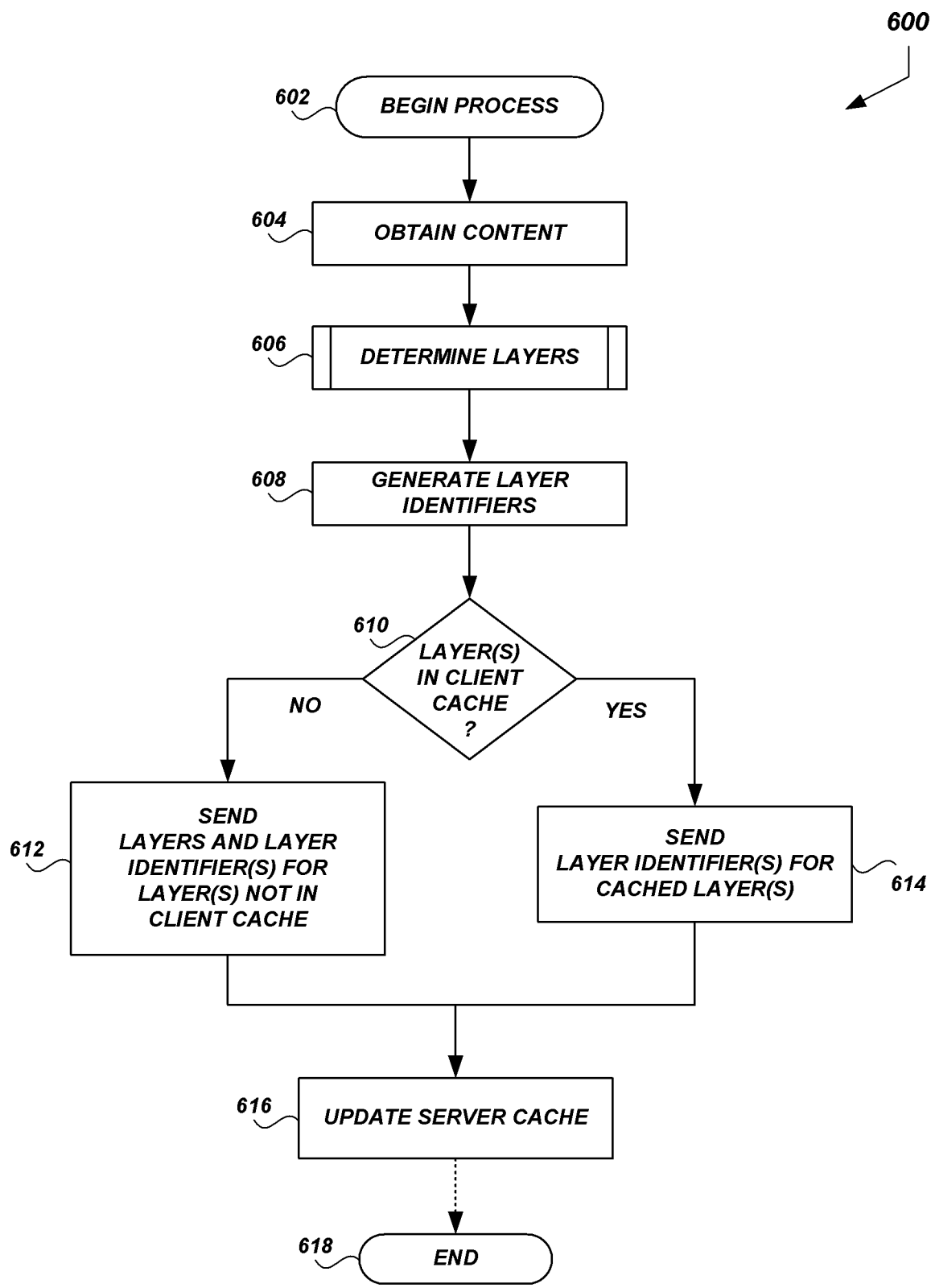
FIG. 6 is a flow diagram of an illustrative process for generating a response including hardware-independent graphics commands for a requested content page according to some embodiments.
Figure 7:
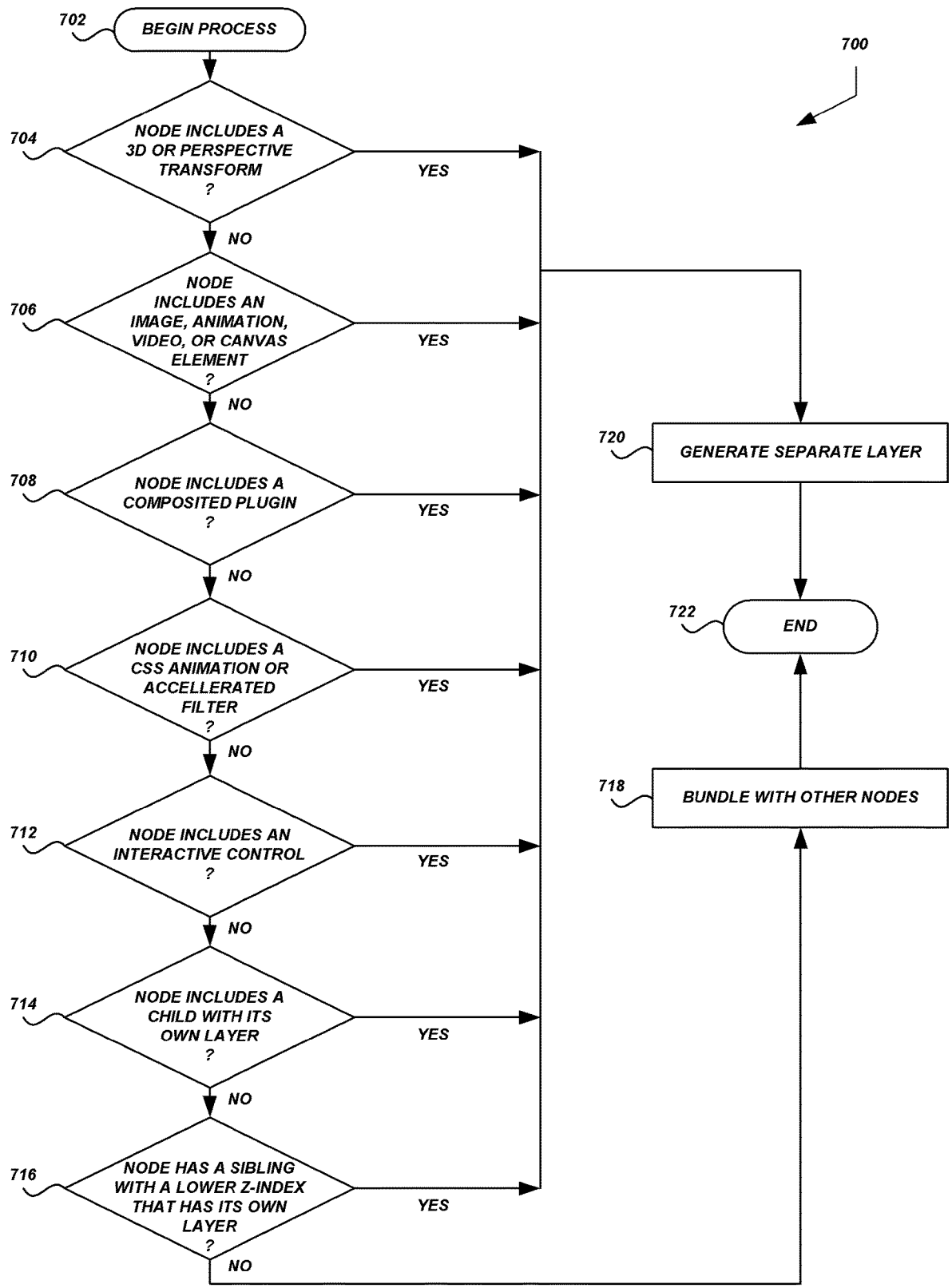
FIG. 7 is a flow diagram of an illustrative process for generating layers according to some embodiments.

FIGS. 6 and 7 are flow diagrams of processes 600 and 700 for generating hardware-independent graphics commands for content pages and individual layers thereof, such as the content page and individual layers shown in FIG. 5, and providing the graphics commands to client browsers.

The process 600 begins at block 602. The process may begin upon receipt of a request, from a client browser 120, for a content page. The intermediary system 104 may instantiate a headless browser 140 instance to process and respond to the request, or the intermediary system 104 may assign the request to an existing headless browser 140 instance. In some embodiments, the client browser 120 may be assigned to a particular headless browser 140 instance for an entire browsing session or some portion thereof, or the client browser 120 may be reconnected to a headless browser 140 instance after a period of inactivity.

At block 604, the headless browser 140 or some other module or component can obtain the requested content. As described in greater detail above, the headless browser 140 may obtain a base resource for the requested content from a content server (e.g., origin server 106 or CDN server 108) and/or a server-side cache, process the base resource to identify referenced resources, obtain and process the referenced resources, etc. The headless browser 140 can generate a render tree model or some other processed version of the content.

At block 606, the headless browser 140 or some other module or component can determine whether to segment visual portions of the page into separate layers. FIG. 7 is a flow diagram of an example process 700 for using rules to segment visual portions of a content page into separate layers. Illustratively, the process 700 can be used to determine which nodes of a render tree should be separated out into individual layers based on the application of a set or "cascade" of segmentation rules. The specific rules shown in FIG. 7 are illustrative only, and are not intended to be limiting. In some embodiments, the process 700 may use fewer rules, additional rules, different rules, etc.

The process 700 begins at block 702. The headless browser 140 may execute the process 700 for each node in the render tree, or for some subset thereof.

At decision block 704, the graphics processing module 152 or some other module or component can determine whether the current node includes object with a 3D or perspective transform. For example, the object may have a CSS property for perspective transform. If the node includes such an object, then the node should be rendered in a separate layer and the process 700 proceeds to block 718. Otherwise, the process 700 continues to the subsequent rules at decision blocks 706-716, below.

At decision block 706, the graphics processing module 152 or some other module or component can determine whether the current node includes an image, animation, video, or canvas object. For example, the node may include an animated GIF file or a video that was referenced by an HTML tag. The process 700 can proceed to block 718, where a separate layer is defined for the node. The separate layer in this case may include hardware-independent graphics commands that cause display of the video in its native form (or some optimized version thereof), rather than hardware-independent graphics commands for each frame of the video. In the case of Skia commands, an SkPicture may be generated that is a wrapper for the video object. Transfer of such an SkPicture to the client browser 120 may also include transfer of the video object in its native form. In some cases, the video object (or other object wrapped in a Skia command) may be modified (e.g., downscaled to reduce bandwidth or provide some other benefit). The video object itself may be transmitted to the client browser 120 to reduce or eliminate the need for constant re-generation and re-transmission of Skia commands to the client browser 120 in order to display the video while it is playing. By providing the video itself, the video can be displayed and controlled (e.g., paused, reviewed, scrubbed, etc.) by the client browser 120 without requiring the additional processing of Skia commands. The same or a similar process may be performed for certain images, interactive canvasses, etc.

At decision block 708, the graphics processing module 152 or some other module or component can determine whether the current node includes, references, or requires processing by a composited plugin (e.g., Flash). If the node includes such content, a separate layer may be defined for the node.

At decision block 710, the graphics processing module 152 or some other module or component can determine whether the current node includes animation, such as CSS animation for opacity, or other effects, such as accelerated CSS filters. If the node includes such content, a separate layer may be defined for the node.

At decision block 712, the graphics processing module 152 or some other module or component can determine whether the current node includes certain interactive controls, such as the drop-down list 508 shown in FIG. 5. Other examples of interactive controls include check boxes, radio buttons, command buttons, and the like. If the node includes such an interactive control, a separate layer may be defined for the node. The separate layer may include hardware-independent graphics commands to paint the interactive control, and may also include or reference metadata regarding how to respond to user interactions with the control. For example, if the interactive control is a drop-down list, the layer may include data regarding the list of options to be presented when a user activates the drop-down list. In this way, the client browser 120 can update the display of the content page at the user device 102 without requiring round-trip communication with the server to obtain graphics commands to update the display of the control. Synchronization data may still be transmitted to the server so that the representation of the content page in the headless browser 140 can be updated to reflect the user interaction and modified display.

At decision block 714, the graphics processing module 152 or some other module or component can determine whether the current node has a descendent for which a separate layer has been defined. For example, the element of the current node has a child element that has its own layer. If the node includes such an element, a separate layer may be defined for the node.

At decision block 716, the graphics processing module 152 or some other module or component can determine whether the current node has a sibling with a lower z-index for which a separate layer has been defined. For example, the element of the current node is to be rendered on top of a separate layer. If the node includes such an element, a separate layer may be defined for the node.

At block 718, the graphics processing module 152 or some other module or component can segment the current node into its own layer based on a decision made at one of decision blocks 704-716, or based on the application of some other rule. The layer defined or generated for the current node at block 718 can be separate from any other layers defined or generated at block 718 for any other nodes of the content page, or separate from a general layer associated with the content page. For example, the layer may be or correspond to a separate SkPicture for the node.

If the process 700 proceeds through decision blocks 704-716 (or blocks for any other rules) without finding a rule satisfied by the current node, then the element of the current node may be bundled with elements from other such nodes for rendering in a single SkPicture.

Returning to FIG. 6, once the process of defining separate layers for individual elements of the render tree has been (optionally) performed, the render tree can be traversed and hardware-independent graphics commands can be generated for the individual nodes of the render tree. When Skia commands are used, the Skia commands can be recorded as SkPictures, and separate SkPictures can be recorded for each layer, if there are multiple layers. Layout information can be generated to indicate to the client browser 120 how the various SkPictures are to be composited for display.

At block 608, the headless browser 140 or some other module or component can generate layer identifiers for each layer defined in block 606, or for some subset thereof. The layer identifiers can be used to uniquely identify layers cached either at the intermediary system 104 or at the user device 102. In some embodiments, the layer identifiers may be based on a hash of some or all of the graphics commands generated for the layer. For example, once hardware-independent graphics commands for a particular layer have been generated as an SkPicture (or some other discrete unit of hardware-independent graphics commands for a particular visual portion of a content page), the SkPicture can be hashed to generate a layer identifier. In some embodiments, the layer identifiers may be based on layout information associated with the layers. For example, an identifier of a particular layer can be generated using a display coordinate, size, and/or boundary of the layer. The layout information may also be hashed to generate the layer identifier.

In addition to the layer identifiers, other properties may be generated for the layers. In some embodiments, a TTL value may be generated or determined for each individual layer, all layers associated with a content page, all layers associated with a domain, etc. For example, the TTL value for a particular layer may be based on a TTL value of a resource (e.g., image) in the visual portion of the page represented by the layer. In some embodiments, the TTL value may be independent of any TTL value associated with objects in the layer or content page. For example, the TTL value may be based on an analysis of how often the visual content of the layer changes, as observed by the intermediary system 104 when processing the content page previously for the same user or client browser 120, or for other users or client browsers 120.

At decision block 610, the headless browser 140 or some other module or component can determine whether one or more layers for the currently requested content page have been cached at the client browser 120 (or at a cache accessible to the client browser 120). In some embodiments, the headless browser 140 may maintain or otherwise have access to information regarding which layers have been provided to the client browser 120, such as a listing of layer identifiers. The headless browser 140 can determine, for the layers of the requested content page, which layers have been previously provided to the client browser 120 (and which of those layers is valid based on the TTL). In some embodiments, the headless browser 140 may transmit layer identifiers of each layer of the content page, and may exclude high-level graphics commands for each layer of the content page. The client browser 120 can then request only those layers which are not present in the client cache. In this way, total bandwidth may be minimized, because no hardware-independent graphics commands are sent unless they are needed. In some embodiments, the client browser 120 may send layer identifiers of some or all layers currently in the client-side cache, and the headless browser 140 can then determine which layers to transmit to the client browser 120 (e.g., transmit only those layers not in the client-side cache). For example, the client browser 120 may provide to the intermediary system 104, in connection with a content page request, layer identifiers for layers associated with the requested content page or the domain of the requested content page.

At block 612, the headless browser 140 or some other module or component can send to the client browser 120 the layers (e.g., the SkPictures or other sets of hardware-independent graphics commands) and corresponding layer identifiers for any layers that have not been previously provided to the client browser 120 (or for any layers that are invalid). In some embodiments, the layer identifiers may not be sent to the client browser 120. Instead, the client browser 120 may generate the layer identifier locally. For example, the client browser 120 may use the same hashing algorithm as the headless browser 140, and can therefore reference, cache, and otherwise work with the layer using the same layer identifier as the headless browser 140.

The hardware-independent graphics commands for any given layer may have been generated in response to the current content request, or they may be retrieved from a server-side cache. In some embodiments, the hardware-independent graphics commands sent to the client browser 120 for one or more layers of the currently requested content page may have been cached at the server-side cache in connection with processing a request from a different user device for the content page, or they may have been cached at the server-side cache in connection with processing a request for a different content page altogether. For example, multiple (e.g., two or more) content pages associated with a particular domain may share one or more common visual portions. Processing of the pages as described herein may therefore result in an identical or substantially identical set of hardware-independent graphics commands for a layer that corresponds to the common visual portion. Hardware-independent graphics commands generated for the layer corresponding to the common visual portion of one content page may be provided in response to requests for the other content pages that share the common visual portion. Because the hardware-independent graphics commands may be identical, the layer identifier based on the hash of the graphics commands or based on the layout properties of the layer may also be identical. In this way, a layer identifier based on hardware-independent graphics commands or other properties of the layer facilitates the use of the cached hardware-independent graphics commands for the layer for each of the multiple pages.

At block 614, the headless browser 140 or some other module or component can send to the client browser 120 the layer identifiers of any layers that have been previously provided to the client browser 120 (and which are still valid). In some embodiments, the layer identifiers of certain layers may be provided instead of the hardware-independent graphics commands even though the currently requested content page has never before been requested by the current client browser 120 (e.g., as long as the layer identified by the identifier has been previously provided to the client browser 120, such as in response to a request for a different page).

At block 616, the headless browser 140 or some other module or component can update the server-side cache with hardware-independent graphics commands for layers of the currently requested content page.

Figure 8:
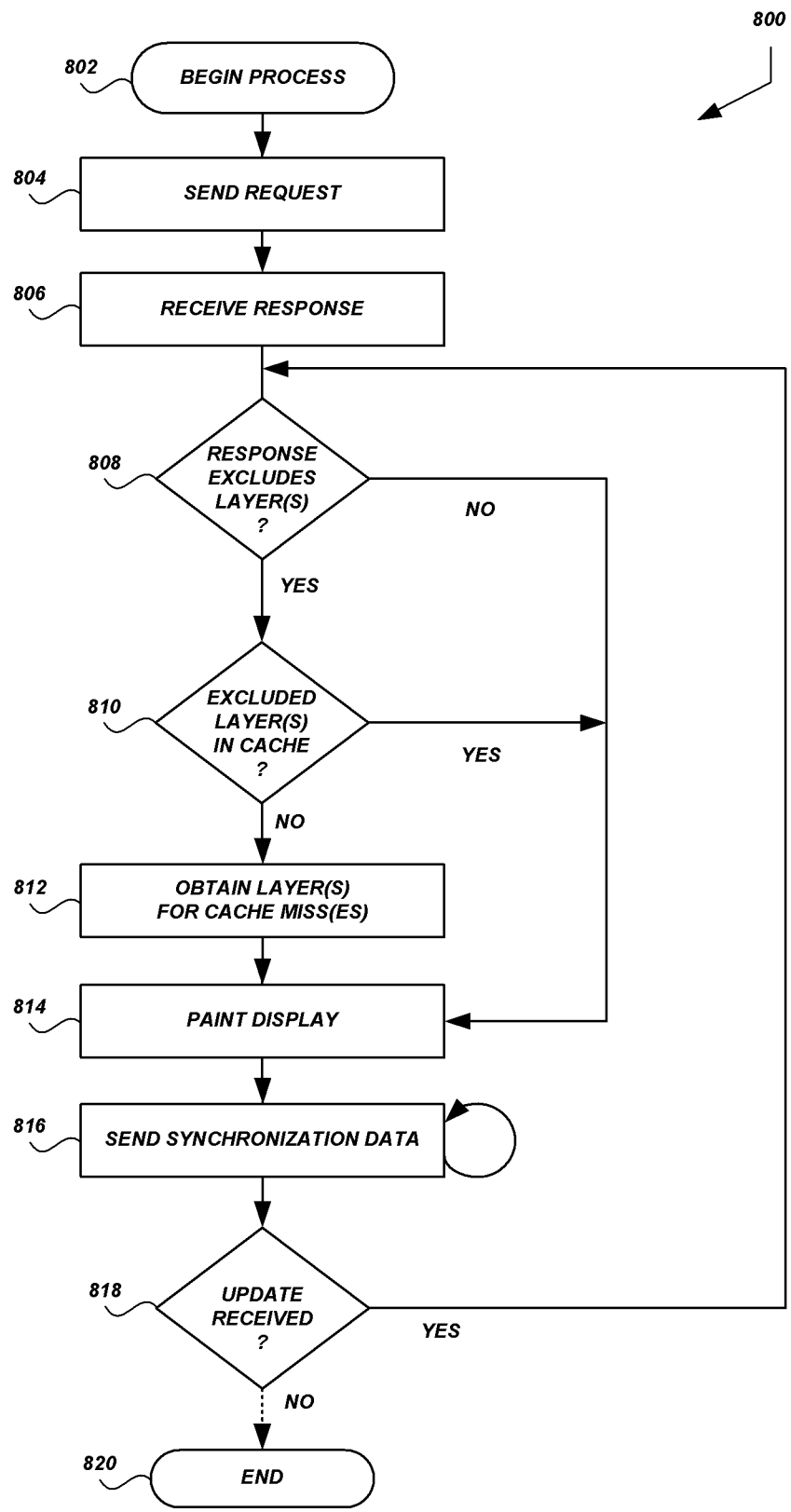
FIG. 8 is a flow diagram of an illustrative process for processing, on a client device, hardware-independent graphics commands received from a server according to some embodiments.

FIG. 8 is a flow diagram of an illustrative process 800 for receiving hardware-independent graphics commands from an intermediary system 104 and generating a representation of requested content on a client browser 120. Advantageously, the process 800 may be executed by a user device that does not necessarily have specialized graphics processing hardware, such as a graphics processing unit ("GPU").

The process 800 begins at block 802. The client browser 120 may execute the process 800 in response to a request for content, such as user input of a URL, activation of a link or bookmark, etc. At block, 804, the client browser 120 can send a request for content to the intermediary system 104. In some embodiments, as described above, the client browser 120 may provide layer identifiers or other information regarding which layers are currently in the client-side cache (e.g., layer identifiers for all valid layers in the cache, layer identifiers for layers associated with the same domain as the requested content page, layers associated with the requested content page, etc.). For example, the client browser 120 may provide layer identifiers bundled with content page requests, subsequent to content page requests, or at some other time such as at the beginning of a browsing session.

At block 806, the client browser 120 can receive a response from the intermediary system 104. The response may include hardware-independent graphics commands in lieu of unprocessed content items. In some embodiments, as described above, the content page may have been segregated into layers at the intermediary system 104. The hardware-independent graphics commands for the individual layers may be sufficient to prepare a composite display of the multiple layers. For example, the hardware-independent graphics commands may reference coordinates or other location indicators that can be used to paint objects in the appropriate location on the display. In some embodiments, the coordinates for hardware-independent graphics commands of a layer may reference relative positions within the layer itself, rather than positions within the overall composite display. In such cases, layout information may be included in the response which indicates how the layers are to be composited for display by the client browser 120.

At decision block 808, the remote graphics module 122 or some other module or component can determine whether the response excludes hardware-independent graphics commands for the requested content page, or for some portion thereof (e.g., one or more layers). If the response does not include hardware-independent graphics commands for one or more layers of the content page, the process 800 can proceed to decision block 810.

At decision block 810, the remote graphics module 122 or some other module or component can determine whether the excluded hardware-independent graphics commands have been cached in a client-side or client-accessible cache. In some embodiments, the remote graphics module 122 can use a layer identifier provided by the headless browser 140 to query the cache for an excluded layer. As described above, the hardware-independent graphics commands for a particular layer may have been previously provided to the client browser 120 in response to previous requests for the currently requested content page or some other content page. If the hardware-independent graphics commands for all of the excluded layers are in the cache (and are valid), then the process 800 can proceed to paint a representation of the content page at block 814. Otherwise, if one or more of the excluded layers are not in the cache (or are not valid), then the process 800 can proceed to obtain the excluded layers at block 812.

At block 812, the remote graphics module 122 or some other module or component can notify the intermediary system 104 of the cache miss, or can otherwise request the hardware-independent graphics commands for the excluded portion(s) not found in the client-side cache. For example, the remote graphics module 122 can transmit a notification including the layer identifier(s) of the excluded layer(s) to the intermediary system 104. The intermediary system 104 can then provide the excluded layer(s) (e.g., the hardware-independent graphics commands for the excluded layers).

At block 814, the remote graphics module 122 or some other module or component can paint a representation of the requested content page by executing the high-level graphics commands obtained from the intermediary system 104 and/or the client-side cache.

At block 816, a user may initiate some interaction with the displayed representation. Synchronization data regarding the user interaction or other modification to the displayed representation may be transmitted to the intermediary system 104. For example, if a user has scrolled the content page (or a portion thereof), coordinates of the position to which the user scrolled, coordinates corresponding to the current portion of the representation displayed in the viewport, or some other information may be provided to the intermediary system 104.

At decision block 818, the client browser 120 can determine whether an update or some other information has been received from the intermediary system 104. The update may include hardware-independent graphics commands generated by the interaction processing module 154 or some other module or component of the intermediary system 104 for the entire content page or for some portion thereof, such as one or more layers. For example, the headless browser 140 may apply synchronization data to an instance of the content page that it is maintaining, or the headless browser 140 may otherwise perform some operation (e.g., execution of JavaScript) that causes some portion of the page (e.g., one layer) to change visually. Hardware-independent graphics commands for that particular layer can be provided to the client browser 120 without providing hardware-independent graphics commands for other layers that have not changed visually. By providing graphics commands for only those layers that have changed, bandwidth may be conserved. If an update or other information has been received, the process may return to decision block 808 for processing. Otherwise, the process 800 may return to block 816 to process additional user interactions, or end at block 820 if no user interactions are received or of the client browser 120 has been terminated.

Additional Embodiments

In some embodiments, hardware-independent graphics commands are not cached by the intermediary system 104 or by the user device 102. Instead, the hardware-independent graphics commands for a requested content page are generated in response to a request and provided to the client browser 120 for execution without querying a cache, generating a layer identifier, etc.

In some embodiments, origin servers, CDN servers, and other content sources may implement the systems and techniques described herein to provide hardware-independent graphics commands directly to user devices 102. In this embodiment, a client browser 120 may provide information identifying it as capable of receiving and executing hardware-independent graphics commands, or the origin server may determine that the client browser 120 is capable using other means. For example, an origin server may launch a headless browser instance that maintains a representation of a content page hosted by the origin server. The headless browser instance can generate hardware-independent graphics commands, and a request for the content page can be served using the hardware-independent graphics commands instead of the unprocessed content items. As another example, the origin server may store hardware-independent graphics commands (e.g., serialized SkPictures) that it transmits to client browsers 120 in response to content requests. In this example, the origin server may not execute a headless browser that produces the hardware-independent graphics commands in response to content requests. The origin server may still use a headless browser 120 to process user interactions, provided updated graphics commands, etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability of hardware and software, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the processes 600, 700 and 800 described with respect to FIGS. 6-8 may be embodied in a set of executable program instructions stored on one or more non-transitory computer-readable media, such as one or more disk drives or solid-state memory devices, of the user device 102 or a computing system with which the intermediary system 104 is associated. When a process 600, 700 or 800 is initiated, the executable program instructions can be loaded into memory, such as RAM, and executed by one or more processors of the user device or computing system. In some embodiments, the computing system may include multiple computing devices, such as servers, and the processes or portions thereof may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to act as an intermediary between user devices and content servers, the system comprising one or more hardware computing devices, wherein the system is programmed to at least:
   receive, from a user device, a request for a content page hosted by a content server, wherein the user device and content server are separate from the one or more computing devices of the system;
   obtain a base file of the content page and one or more embedded resources referenced by the base file;
   generate, using an application instance executing on the one or more computing devices, a render tree based at least partly on the content page;
   determine a plurality of visual portions of the content page based at least partly on characteristics of portions of the render tree;
   generate, using the plurality of visual portions, a plurality of sets of hardware-independent graphics commands, wherein the plurality of sets of hardware-independent graphics commands each instruct the user device to display a representation of a different portion of the plurality of visual portions, and wherein each representation of a different portion is independently updatable;
   in response to the request for the content page, transmit the plurality of sets of hardware-independent graphics commands to the user device over a network;
   determine, based on user interaction data received from the user device, that a first visual portion of the plurality of visual portions is outdated;
   determine, based on the user interaction data, an update to be made on the user device to the outdated first visual portion;
   generate an update set of hardware-independent graphics commands that is executable by the user device to make the update to the outdated first visual portion, said update set being specific to the first visual portion; and
   send the update set of hardware-independent graphics commands over the network to the user device to cause the user device to update the outdated first visual portion without updating any other visual portion.

2. The system of claim 1, wherein the hardware-independent graphics commands comprise software abstraction layer commands that are not graphics processing unit-specific.

3. The system of claim 1, wherein the hardware-independent graphics commands comprise graphics library commands.

4. The system of claim 1, wherein the system is further programmed to:
   cache at least a first set of the plurality of sets of hardware-independent graphics commands; and
   provide the cached first set to a different user device in response to a subsequent request for the content page.

5. The system of claim 1, wherein the system is programmed to generate the hardware-independent graphics commands by recording the high-level graphics commands in a format that can be executed by the user device.

6. The system of claim 1, wherein the application instance executing on the one or more computing devices comprises a headless browser.

7. The system of claim 1, wherein the system is programmed to determine the plurality of visual portions by a process that comprises selecting elements of the render tree to bundle together into a common visual portion based at least partly on whether the elements are dynamic.

8. A computer-implemented method comprising:
   as implemented by one or more server computing devices configured to execute specific instructions,
      obtaining, in response to a request from a user device separate from the one or more server computing devices, one or more network resources associated with a content page;
      determining a plurality of visual portions of the content page based at least partly on characteristics of portions of the content page;
      generating, based at least partly on the plurality of visual portions, a plurality of sets of hardware-independent graphics commands, wherein the plurality of sets of hardware-independent graphics commands, when executed on the user device, will each cause the user device to display a representation of a different portion of the content page, and wherein each representation of a different portion of the content page is independently updatable;
      in response to the request for the content page, transmitting the plurality of sets of hardware-independent graphics commands to the user device;
      determining, based on user interaction data received from the user device, that a first visual portion of the plurality of visual portions is outdated;
      determining, based on the user interaction data, an update to be made to the outdated first visual portion;
      generating an update set of hardware-independent graphics commands that is executable by the user device to make the update to the outdated first visual portion, said update set being specific to the first visual portion; and
      sending the update set of hardware-independent graphics commands to the user device to cause the user device to update the outdated first visual portion without updating any other visual portion.

9. The computer-implemented method of claim 8, wherein at least one of the one or more server computing devices comprise an origin server of the content page.

10. The computer-implemented method of claim 8, wherein the one or more server computing devices are part of a system that acts as an intermediary between user devices and content servers.

11. The computer-implemented method of claim 8, wherein the hardware independent graphics commands comprise software abstraction layer commands that are not graphics processing unit-specific.

12. The computer-implemented method of claim 8, wherein the hardware-independent graphics commands comprise graphics library commands.

13. The computer-implemented method of claim 8, further comprising:
   caching at least a first set of the plurality of sets of hardware-independent graphics commands; and
   providing the cached first set to a different user device in response to a subsequent request for the content page.

14. The computer-implemented method of claim 8, wherein generating hardware-independent graphics commands comprising recording the hardware-independent graphics commands in a format that can be executed by the user device.

15. The computer-implemented method of claim 14, wherein the hardware-independent graphics commands are generated as an SkPicture.

16. The computer-implemented method of claim 8, wherein determining the plurality of visual portions comprises generating a render tree representation of the content page, and selecting elements of the render tree to bundle together into a common visual portion based at least partly on whether the elements are dynamic.

17. The computer-implemented method of claim 16, wherein determining the plurality of visual portions further comprises creating a separate visual portion for a dynamic element of the render tree to enable the dynamic element to be updated separately from other elements of the render tree.

18. A non-transitory computer storage system having stored thereon a browser module configured to execute a process on a user computing device, the process comprising:
   transmitting a request for a content page to a server system that acts as an intermediary between the user computing device and content servers;
   in response to the request, receiving, from the server system, a plurality of sets of hardware-independent graphics commands, wherein a set of the plurality of sets of hardware-independent graphics commands is associated with a representation of a visual portion of a plurality of visual portions of the content page, the plurality of visual portions determined by the server system based at least partly on characteristics of portions of the content page;
   executing the plurality of sets of hardware-independent graphics commands, wherein each of the plurality of sets of hardware-independent graphics commands causes the user computing device to display a representation of a different portion of the content page, and wherein each representation of a different portion of the content page is independently updatable;
   transmitting user interaction data to the server system in response to a user interaction that causes a first of the plurality of visual portions to become outdated;
   receiving from the server system an update set of hardware independent graphics commands that is executable to update the outdated first visual portion without updating other visual portions of the content page; and
   executing the update set of hardware independent graphics commands.

19. The non-transitory computer storage system of claim 18, wherein the browser module comprises one of: an application; a browser plug-in, or a browser extension.

20. The non-transitory computer storage system of claim 18, wherein the user computing device does not comprise specialized graphics processing hardware.

21. The non-transitory computer storage system of claim 18, wherein the hardware-independent graphics commands comprise software abstraction layer commands that are not graphics processing unit-specific.

22. The non-transitory computer storage system of claim 18, wherein the hardware-independent graphics commands comprise graphics library commands.

23. The system of claim 1, wherein the system is programmed to determine the plurality of visual portions by a process that comprises creating a separate visual portion for a dynamic element of the render tree to enable the dynamic element to be updated separately from other elements of the render tree.

24. The non-transitory computer storage system of claim 18, wherein the user interaction comprises a user action that triggers execution of JavaScript of the content page, and wherein the update set of hardware independent graphics commands are configured to update the first of the plurality of visual portions to reflect the execution of the JavaScript.

25. The system of claim 1, wherein the user interaction data specifies a user action that triggers execution of a script of the content page, and wherein determining the update to be made comprises executing the script on the one or more server computing devices.

\* \* \* \* \*